US008102750B2

(12) United States Patent
Eto et al.

(10) Patent No.: US 8,102,750 B2
(45) Date of Patent: Jan. 24, 2012

(54) SUPER RESOLUTION PRODUCING APPARATUS CAPABLE OF ADJUSTING REPRODUCTION POWER

(75) Inventors: Soichiro Eto, Tokyo (JP); Toshimichi Shintani, Kodaira (JP); Hiroyuki Minemura, Kokubunji (JP)

(73) Assignee: Hitachi Consumer Electronics Co., Ltd, Tokyo (JP)

( * ) Notice: Subject to any disclaimer, the term of this patent is extended or adjusted under 35 U.S.C. 154(b) by 0 days.

(21) Appl. No.: 12/539,813

(22) Filed: Aug. 12, 2009

(65) Prior Publication Data

US 2010/0083295 A1     Apr. 1, 2010

(30) Foreign Application Priority Data

Sep. 30, 2008   (JP) ................... 2008-252982

(51) Int. Cl.
*G11B 7/00* (2006.01)
(52) U.S. Cl. ..................... 369/116; 369/13.27
(58) Field of Classification Search ............... 369/13.27, 369/13.26, 13.28, 13.25, 13.24, 116, 47.5, 369/47.51, 47.52, 47.53, 13.07, 13.08
See application file for complete search history.

(56) References Cited

U.S. PATENT DOCUMENTS

| | | | | |
|---|---|---|---|---|
| 5,862,103 A | * | 1/1999 | Matsumoto et al. | ........ 369/13.27 |
| 6,067,284 A | * | 5/2000 | Ikeda et al. | ................... 369/116 |
| 6,418,102 B1 | * | 7/2002 | Suga | ......................... 369/47.53 |
| 6,430,128 B1 | | 8/2002 | Kato et al. | |
| 6,552,967 B1 | * | 4/2003 | Tsutsui et al. | ............ 369/13.27 |
| 6,744,700 B2 | * | 6/2004 | Tsutsui et al. | ............ 369/13.26 |
| 6,859,426 B1 | | 2/2005 | Ogawa et al. | |
| 7,551,524 B2 | * | 6/2009 | Colbum et al. | ............ 369/13.27 |
| 2002/0080697 A1 | | 6/2002 | Akiyama | |
| 2002/0196719 A1 | | 12/2002 | Morishima | |
| 2005/0117507 A1 | | 6/2005 | Hwang et al. | |
| 2005/0157631 A1 | | 7/2005 | Lee et al. | |
| 2007/0140083 A1 | | 6/2007 | Bae et al. | |
| 2007/0274185 A1 | | 11/2007 | Kikukawa et al. | |
| 2010/0290328 A1 | * | 11/2010 | Eto et al. | ................... 369/47.53 |

FOREIGN PATENT DOCUMENTS

EP     1 884 939 A1     2/2008

(Continued)

OTHER PUBLICATIONS

K. Yasuda et al., Premastered Optical Disk by Superresolution, Japanese Journal of Applied Physics, vol. 32, Part 1, No. 11B, Nov. 1993, pp. 5210-5213.

(Continued)

*Primary Examiner* — Tan X Dinh
(74) *Attorney, Agent, or Firm* — Mattingly & Malur, P.C.

(57) ABSTRACT

When a super resolution technology for optical disks is used in a situation where optical disk management information is formed with a signal that cannot be reproduced by a reproduction method based on a conventional optical disk technology, optical disk drives cannot make recording adjustments and/or reproduction adjustments. An optical disk drive uses an optical disk that forms a management information signal with pits not smaller in size than optical resolution and can be read by a reproduction method based on a conventional optical disk technology. When the optical disk drive records information onto or reproduces information from the optical disk having the super resolution region, it is possible to make proper recording adjustments or reproduction adjustments and perform a proper recording operation or reproducing operation in an optical disk's information region for user information recording or reproduction.

5 Claims, 36 Drawing Sheets

FOREIGN PATENT DOCUMENTS

| | | |
|---|---|---|
| JP | 2006-209898 A | 8/2006 |
| WO | 2007/000682 A1 | 1/2007 |
| WO | 2007/100139 A1 | 9/2007 |

OTHER PUBLICATIONS

T. Shintani et al., Sub-Terabyte-Data-Capacity Optical Discs Realized by Three-Dimensional Pit Selection, Japanese Journal of Applied Physics, vol. 45, No. 4A, 2006, pp. 2593-2597.

Y. Anzai et al., Fabrication of Discs for Three-Dimensional Pit Selection Using Damascene Process, Japanese Journal of Applied Physics, vol. 46, No. 6B, 2007, pp. 3917-3921.

K. Lee et al., Approach to high density more than 40GB per layer with Blu-ray disc format (Invited), TuB2.pdf, Digital Media R&D Center.

* cited by examiner

FIG. 2B

| INFORMATION RECORDING LAYER | FIRST LAYER | | | | | | |
|---|---|---|---|---|---|---|---|
| RADIUS | 20–22mm | 22–24mm | | SEVERAL TRACKS | | 24–56mm | |
| INFORMATION REGION NAME | BURST CUTTING AREA (BCA) | CONTROL DATA AREA (CDA) | | BUFFER AREA (BA) | | USER DATA AREA (UDA) | |
| RECORDED INFORMATION | DISK ID, ETC. | MANAGEMENT INFORMATION | | BOUNDARY INFORMATION | | USER INFORMATION | |
| SIGNAL TYPE | ROM (EMBOSSED STRUCTURE) | | | | | | |
| INFORMATION REGION DESCRIPTION | BD-COMPLIANT REGION | | | | | SUPER RESOLUTION REGION | |
| MODULATION | 1–7pp | | | | | 1–7pp | |
| 1Tw | 75nm | | | | | 25nm | |
| TRACK PITCH | 320nm | | | | | 240nm | |

FIG. 8C

| INFORMATION RECORDING LAYER | FIRST LAYER | | | | SECOND LAYER |
|---|---|---|---|---|---|
| RADIUS | 20–22mm | 22–24mm | | 24–56mm | 20–56mm |
| INFORMATION REGION NAME | BCA | CDA | SEVERAL TRACKS | UDA | UDA |
| RECORDED INFORMATION | DISK ID, ETC. | MANAGEMENT INFORMATION | BA BOUNDARY INFORMATION | USER INFORMATION | USER INFORMATION |
| SIGNAL TYPE | ROM (EMBOSSED STRUCTURE) | | | | |
| INFORMATION REGION DESCRIPTION | BD-COMPLIANT REGION | | | SUPER RESOLUTION REGION | SUPER RESOLUTION REGION |
| MODULATION | 1–7pp | 1–7pp | | 1–7pp | 1–7pp |
| 1Tw | | 75nm | | 25nm | 25nm |
| TRACK PITCH | | 320nm | | 240nm | 240nm |

FIG. 9B

| INFORMATION RECORDING LAYER | FIRST LAYER | | | | SECOND LAYER |
|---|---|---|---|---|---|
| RADIUS | 20–22mm | 22–24mm | SEVERAL TRACKS | 24–56mm | 20–56mm |
| INFORMATION REGION NAME | BCA | CDA | BA | UDA | UDA |
| RECORDED INFORMATION | DISK ID, ETC. | MANAGEMENT INFORMATION | BOUNDARY INFORMATION | USER INFORMATION | USER INFORMATION |
| SIGNAL TYPE | ROM (EMBOSSED STRUCTURE) | | | | |
| INFORMATION REGION DESCRIPTION | BD-COMPLIANT REGION | BD-COMPLIANT REGION | | SUPER RESOLUTION REGION | BD-COMPLIANT REGION |
| MODULATION | 1–7pp | 1–7pp | | 1–7pp | 1–7pp |
| 1Tw | 75nm | 75nm | | 25nm | 75nm |
| TRACK PITCH | 320nm | 320nm | | 240nm | 320nm |

FIG. 11C

| INFORMATION RECORDING LAYER | FIRST LAYER | | | SECOND LAYER |
|---|---|---|---|---|
| RADIUS | 20-22mm | 22-24mm | 24-56mm | 20-56mm |
| INFORMATION REGION NAME | BCA | CDA | UDA | UDA |
| RECORDED INFORMATION | DISK ID, ETC. | MANAGEMENT INFORMATION | USER INFORMATION | USER INFORMATION |
| SIGNAL TYPE | ROM (EMBOSSED STRUCTURE) | | | |
| INFORMATION REGION DESCRIPTION | BD-COMPLIANT REGION | | | SUPER RESOLUTION REGION |
| MODULATION | 1-7pp | 1-7pp | | 1-7pp |
| 1Tw | 75nm | | | 25nm |
| TRACK PITCH | 320nm | | | 240nm |

FIG. 12C

| INFORMATION RECORDING LAYER | FIRST LAYER | | | | |
|---|---|---|---|---|---|
| RADIUS | 20–22mm | 22–24mm | 24–40mm | SEVERAL TRACKS | 24–56mm |
| INFORMATION REGION NAME | BCA | CDA | UDA1 | BA | UDA2 |
| RECORDED INFORMATION | DISK ID, ETC. | MANAGEMENT INFORMATION | USER INFORMATION | BOUNDARY INFORMATION | USER INFORMATION |
| SIGNAL TYPE | ROM (EMBOSSED STRUCTURE) | | | | |
| INFORMATION REGION DESCRIPTION | BD-COMPLIANT REGION | | | | SUPER RESOLUTION REGION |
| MODULATION | 1–7pp | | | | 1–7pp |
| 1Tw | 75nm | | | | 25nm |
| TRACK PITCH | 320nm | | | | 240nm |

FIG. 13C

| INFORMATION RECORDING LAYER | FIRST LAYER | | | | SECOND LAYER | | |
|---|---|---|---|---|---|---|---|
| RADIUS | 20-22mm | 22-24mm | SEVERAL TRACKS | 24-25mm | 25-56mm | 20-21mm | 21-56mm |
| INFORMATION REGION NAME | BCA | CDA | BA | DTZ | UDA | DTZ | UDA |
| RECORDED INFORMATION | DISK ID, ETC. | MANAGEMENT INFORMATION | BOUNDARY INFORMATION | FOR TEST WRITE | USER INFORMATION | FOR TEST WRITE | USER INFORMATION |
| SIGNAL TYPE | ROM (EMBOSSED STRUCTURE) | | | R (L/G: Land/Groove) | | | |
| INFORMATION REGION DESCRIPTION | BD-COMPLIANT REGION | | | SUPER RESOLUTION REGION | | | |
| MODULATION | 1-7pp | | — | 1-7pp | | | |
| 1Tw | 75nm | | — | 25nm | | | |
| TRACK PITCH | 320nm | | | 240nm | | | |

DIRECTION OF LIGHT INCIDENCE

FIG. 17B

| INFORMATION RECORDING LAYER | FIRST LAYER | | | | |
|---|---|---|---|---|---|
| RADIUS | 20–22mm | 22–24mm | 24–24.5mm | 24.5–56mm |
| INFORMATION REGION NAME | BCA | CDA | BA | UDA |
| RECORDED INFORMATION | DISK ID, ETC. | MANAGEMENT INFORMATION | — | USER INFORMATION |
| SIGNAL TYPE | ROM (EMBOSSED STRUCTURE) | | — | ROM |
| INFORMATION REGION DESCRIPTION | BD-COMPLIANT REGION | | — | SUPER RESOLUTION REGION |
| MODULATION | 1–7pp | | — | 1–7pp |
| 1Tw | 75nm | | — | 25nm |
| TRACK PITCH | 320nm | | — | 240nm |

FIG. 18

| POLISHING | | NOT POLISHED | POLISHED | POLISHED |
|---|---|---|---|---|
| INFORMATION REGION DESCRIPTION | | BD-COMPLIANT REGION | BD-COMPLIANT REGION | SUPER RESOLUTION REGION |
| OPTICAL CHARACTERISTICS OF LOW-TEMPERATURE REGION | PIT REFLECTIVITY | 30% | 30% | 30% |
| | SPACE REFLECTIVITY | 30% | 30% | 30% |
| | PIT/SPACE PHASE DIFFERENCE* | 0.2π | 0π | 0π |
| OPTICAL CHARACTERISTICS OF HIGH-TEMPERATURE REGION | PIT REFLECTIVITY | 20% | 20% | 20% |
| | SPACE REFLECTIVITY | 20% | 30% | 30% |
| | PIT/SPACE PHASE DIFFERENCE* | 0.2π | 0.1π | 0.1π | ent application JP2008-252982 filed on Sep. 30, 2008, the
SUPER RESOLUTION PRODUCING APPARATUS CAPABLE OF ADJUSTING REPRODUCTION POWER

CLAIM OF PRIORITY

The present application claims priority from Japanese patent application JP2008-252982 filed on Sep. 30, 2008, the content of which is hereby incorporated by reference into this application.

BACKGROUND OF THE INVENTION

The present invention relates to an information recording medium and an optical recording/reproducing apparatus, and more particularly to an information recording medium and optical recording/reproducing apparatus for use with a super resolution technology that reproduces pits smaller in size than optical resolution by using heat generated upon laser irradiation.

Optical disks are widely used as information recording media. When an optical disk is used to record a signal or reproduce a recorded signal, an information recording layer of the optical disk is irradiated with laser light that is focused by an objective lens. The size of the resulting focused light spot is expressed by $\lambda/NA$ where $\lambda$ is the wavelength of the laser light and NA is the numerical aperture of the objective lens. When this spot size is used to reproduce a repetitive pattern in which data pits and spaces have the same length, the data pit size for acquiring a finite reproduction signal amplitude is $\lambda/4$ NA or larger. Sizes smaller than $\lambda/4$ NA are said to be smaller than optical resolution. Conventional optical disk technologies represented by CDs, DVDs, HD-DVDs, and Blu-ray Discs (BDs) assume that the minimum size of employed data pits is not smaller than optical resolution. Therefore, the recording capacity of optical disks is increased from 0.65 GB (CDs) to 25 GB (BDs) mainly by decreasing the wavelength $\lambda$ of laser light from 780 nm to 405 nm and increasing the numerical aperture NA of the objective lens from 0.5 to 0.85, thus reducing the size of the focused light spot.

An optical disk using data pits smaller in size than optical resolution is described in Optical Data Storage 2007, TuB2. As regards this optical disk, only the shortest pit is smaller in size than optical resolution, whereas the others are not smaller in size than optical resolution. As the information on this optical disk is reproduced in the same manner as with the conventional optical disk technology, the signal amplitude derived from the shortest pit is substantially zero. However, pits other than the shortest pit are not smaller in size than optical resolution, and the amplitudes of reproduction signals derived from such pits are finite. Therefore, a signal derived from the shortest pit can also be decoded when a signal process is performed with reference to the signals derived from pits other than the shortest pit. This enables this optical disk to achieve a surface density of 42 GB.

It is conceivable that the capacity can be further increased by decreasing the wavelength $\lambda$ of an employed light source and increasing the numerical aperture NA of an employed lens. However, when the light source wavelength is shorter than 405 nm, it is the wavelength of ultraviolet light. In such an instance, the light is absorbed by a disk substrate and a protective layer. Thus, it would be difficult to achieve satisfactory recording/reproducing quality. Further, if the lens numerical aperture is increased, near-field light is emitted from the objective lens. This makes it necessary to unduly decrease the distance between the objective lens and a medium during a recording/reproduction process. If such a configuration is employed, a read/write error is likely to occur due to the deformation or dirtiness of an employed disk. Thus, it would be difficult to change the medium although optical disks have an advantage of being readily changeable.

Meanwhile, a super resolution technology is proposed as a different method for achieving high density. The super resolution technology makes it possible to reproduce pits smaller in size than optical resolution (super resolution reproduction) by providing an optical disk with a certain mechanism.

A super resolution technology based on the use of a phase-change material is described, for instance, in Non-patent Document 1. Under normal conditions, the phase-change material is used as a recording film for rewritable optical disks such as CD-RW, DVD-RAM, DVD±RW, and Blu-ray discs. The phase-change material changes its phase (crystalline, molten, or noncrystalline) and optical characteristics in accordance with the heat generated upon laser irradiation. The method disclosed in Non-patent Document 1 uses an optical disk that is produced by forming a film of a phase-change material (a phase-change film) on a read-only type (ROM) substrate. When the information on the optical disk is reproduced, a part of the phase-change film within an irradiation light spot melts due to the heat generated upon laser irradiation so that the optical characteristics (e.g., refractive index and reflectivity) change. When the irradiation light spot on a recording medium contains a region where the optical characteristics are changed, the status of light reflected from the irradiation light spot is different from a case where the irradiation light spot does not contain the region where the optical characteristics are changed. The light reflected when the irradiation light spot contains a region where the optical characteristics are changed changes its status to a greater extent in accordance with a signal of the ROM substrate than when the irradiation light spot does not contain the region where the optical characteristics are changed. Therefore, it is possible to reproduce pits that are smaller in size than optical resolution. As described above, the super resolution technology is a technology for reproducing microscopic pits by using heat that is generated upon laser irradiation for reproduction. Here, a substance that changes its optical characteristics in accordance with temperature and is used to achieve super resolution is called a super resolution substance.

The super resolution technology described in Non-patent Documents 2 and 3 uses a phase-change material as the super resolution substance. This super resolution technology uses a disk constructed so that only a pit (or mark) portion is made of a phase-change material. According to Non-patent Document 2, a disk is prepared by performing crystalline/noncrystalline selective etching on a phase-change film to leave noncrystalline marks only and forming a protective film on a space portion. According to Non-patent Document 3, on the other hand, an optical disk is prepared by chemically polishing a phase-change film formed on a ROM type substrate and embedding a phase-change material in a concaved pit portion only. Super resolution reproduction is accomplished because the phase-change film for pits in a high-temperature region within an irradiation light spot melts upon laser irradiation for reproduction to change the optical characteristics. When this method is used, the phase-change material exists only in a pit portion. Therefore, a melt region can be limited to a smaller size than when the phase-change film is formed on the whole surface. Consequently, the use of this method makes it possible to reproduce extremely small pits.

Technologies based, for instance, on multilayering, near-field light, or two-photon absorption are proposed as optical disk density enhancement technologies that differ from the technologies disclosed in the above non-patent Documents. The multilayering technology increases the capacity in the cubic direction by providing a disk with a plurality of information recording layers, which are more or less spaced apart from each other. Recording and reproducing operations for each layer are performed by focusing a laser beam on each layer. As mentioned in Non-patent Document 2, it is expected that the multilayering technology can be combined with the super resolution technology.

LIST OF THE DOCUMENTS

Non-patent Document 1: Japanese Journal of Applied Physics 32, 5210
Non-patent Document 2: Japanese Journal of Applied Physics 45, 2593
Non-patent Document 3: Japanese Journal of Applied Physics 46, 3917

BRIEF SUMMARY OF THE INVENTION

When user information recorded on an optical disk is to be reproduced or user information is to be recorded onto the optical disk, an optical disk drive usually reproduces and acquires management information, which includes address information about a region where the user information is recorded as well as information indicating recommended recording power or recommended reproduction power, and adjusts a recording or reproducing operation in accordance with the acquired management information.

When an optical disk based on the super resolution technology is to be put to practical use, it may be variously configured. For example, the optical disk may be configured so that the entire information region of all information recording layers is a super resolution region or that the entire region of some information recording layers is a super resolution region. Basically, it is conceivable that the operations of an optical disk drive will be controlled in accordance with certain management information. However, if the management information is recorded in the super resolution region, the management information cannot be reproduced by reproduction methods based on conventional optical disk technologies. For recording density enhancement purposes, it is expected that the track intervals of a region where information is recorded by the super resolution technology will be shorter than with the conventional optical disk technologies (e.g., BDs and DVDs). If the track intervals are smaller than optical resolution, the conventional technologies cannot reproduce the management information because they cannot exercise tracking servo control. Even when the track intervals in the super resolution region where the management information is recorded are long enough that tracking servo control can be exercised during reproduction based on a conventional optical disk technology, the reproduction power required during the use of a conventional technology is quite different from the reproduction power required for super resolution reproduction. In addition, a reproduction signal output immoderately depends on the reproduction power. Therefore, it is difficult to achieve reproduction without adjusting the reproduction power.

FIGS. 1A and 1B are prepared to indicate that reproduction power adjustments are essential because a reproduction signal output for super resolution reproduction immoderately depends on the reproduction power. These Figures show the results of measurements of the relationship between the reproduction power Pr and the reproduction signal amplitude of a signal pattern recorded at a super resolution or the amplitude of a push-pull signal, that is, a tracking error signal. The super resolution technology irradiates a recording medium with laser light to form a light spot of a predetermined size and create a temperature distribution within an irradiated region, and reproduces pits smaller in size than optical resolution by making use of the reflectivity and phase differences between a low-temperature region, which is a region where the optical characteristics of a super resolution substance within the light spot are the same as at a normal temperature, and a high-temperature region, which is a region where the optical characteristics of the super resolution substance are not the same as at the normal temperature. Consequently, the quality of a reproduction signal varies with the size of the high-temperature region within the light spot.

FIGS. 1A and 1B show the results of super resolution reproduction of a pure tone pattern, which is a pattern where 50 nm pits and spaces, which are smaller than optical resolution, are repeated, and is reproduced at a super resolution with an optical pickup having a light source wavelength $\lambda$ of 405 nm and an objective lens numerical aperture NA of 0.85. The track intervals between pure tone patterns are set to be 200 nm. Experiment results shown in FIG. 1A indicate that the reproduction signal amplitude begins to increase when the reproduction power Pr is between 0.625 mW and 0.75 mW, produces a super resolution effect when the reproduction power Pr is substantially equal to or higher than 0.75 mW, and reaches its maximum value when the reproduction power Pr is equal to 1.25 mW. Further, when the reproduction power Pr increases or decreases from 1.25 mW, the reproduction signal amplitude decreases. Similarly, experiment results shown in FIG. 1B indicate that the push-pull signal amplitude produces a super resolution effect when the reproduction power Pr is substantially equal to or higher than 0.75 mW, and reaches its maximum value when the reproduction power Pr is equal to 1.25 mW. As is the case with the reproduction signal amplitude shown in FIG. 1A, the push-pull signal amplitude decreases when the reproduction power increases or decreases from 1.25 mW. It means that the push-pull signal amplitude is greatly affected by changes in the size of the high-temperature region within the light spot.

As is obvious from the above, there is an optimum reproduction power for super resolution reproduction. More specifically, there is an optimum size of the high-temperature region within the light spot. When the size of the high-temperature region is smaller or larger than the optimum size, the reproduction signal amplitude and tracking error signal are both small. Therefore, when the super resolution technology is used, reproduction power control is essential because the reproduction power greatly affects reproduction signal quality and tracking error signal quality.

If an optical disk drive's reproduction optical system is initially optimized for super resolution reproduction, reproduction may be achieved even when the management information is recorded in the super resolution region. However, the reproduction power required for super resolution reproduction is significantly higher than the reproduction power required for normal resolution reproduction. Therefore, if the reproduction power optimized for super resolution reproduction is used to read the entire disk surface, the information recorded in a normal resolution region may become damaged. Further, it is anticipated that the reproduction power required for super resolution reproduction varies with the characteristics of an employed medium. It is therefore essential that the reproduction power be controlled in a manner appropriate for each medium. Furthermore, optimizing the optical disk drive's reproduction optical system for super resolution reproduction makes it impossible to read optical disks based on the conventional technologies. Such optimization is impractical from the viewpoint of apparatus design because it does not provide downward compatibility.

An object of the present invention is to provide an information recording medium based on super resolution technology and an optical recording/reproducing apparatus, which are capable of using information regarding optimum recording power and/or optimum reproduction power and adjusting recording power and/or reproduction power to a optimum while maintaining downward compatibility of the apparatus.

The problem described above can be addressed by recording the management information in the normal resolution region of an optical disk even if the user information is recorded in the super resolution region of the optical disk. If the optical disk has a plurality of recording layers, the optical disk is configured so that the management information is formed in the normal resolution region of at least one recording layer.

As the management information is formed in the normal resolution region, the reproduction power for an initial disk read can be preset with reference to a normal resolution method. This means that the disk has no risk of being damaged by excessive reproduction power of laser irradiation. It is therefore possible to provide an optical disk or optical disk drive that is capable of reproducing the management information without fail while maintaining downward compatibility.

As the management information, positional information (e.g., address information and region information), which indicates where on an optical disk the information recorded by a super resolution method is positioned, is recorded in the normal resolution region. If necessary, a recommended reproduction power value for super resolution region reproduction may be recorded in the normal resolution region. Further, the optical disk drive may incorporate a function for performing a "test read" of the super resolution region. This makes it possible to provide an optical disk drive that is capable of presetting a reproduction power with increased accuracy.

In situations where an optical disk drive records information onto or reproduces information from an optical disk having the super resolution region, the present invention makes it possible to offer an optical disk or optical disk drive that is capable of making appropriate adjustments for recording or reproducing operations while maintaining downward compatibility of the apparatus.

BRIEF DESCRIPTION OF THE DRAWINGS

FIG. 2B shows specifications for the optical disk recording layer, which is shown in FIG. 2A.

FIG. 8C shows specifications for recording layers of the first format according to the third embodiment.

FIG. 9B shows specifications for recording layers of the second format according to the third embodiment.

FIG. 11C shows specifications for recording layers of the third format according to the third embodiment.

FIG. 12C shows specifications for a recording layer of the fourth format according to the third embodiment.

FIG. 13C shows specifications for recording layers of the optical disk according to the fourth embodiment.

FIG. 17B shows specifications for the recording layer of the optical disk shown in FIG. 17A.

FIG. 18 is a comparison table illustrating the relationship between polishing and optical characteristics.

DETAILED DESCRIPTION OF THE INVENTION

Figure 1A:
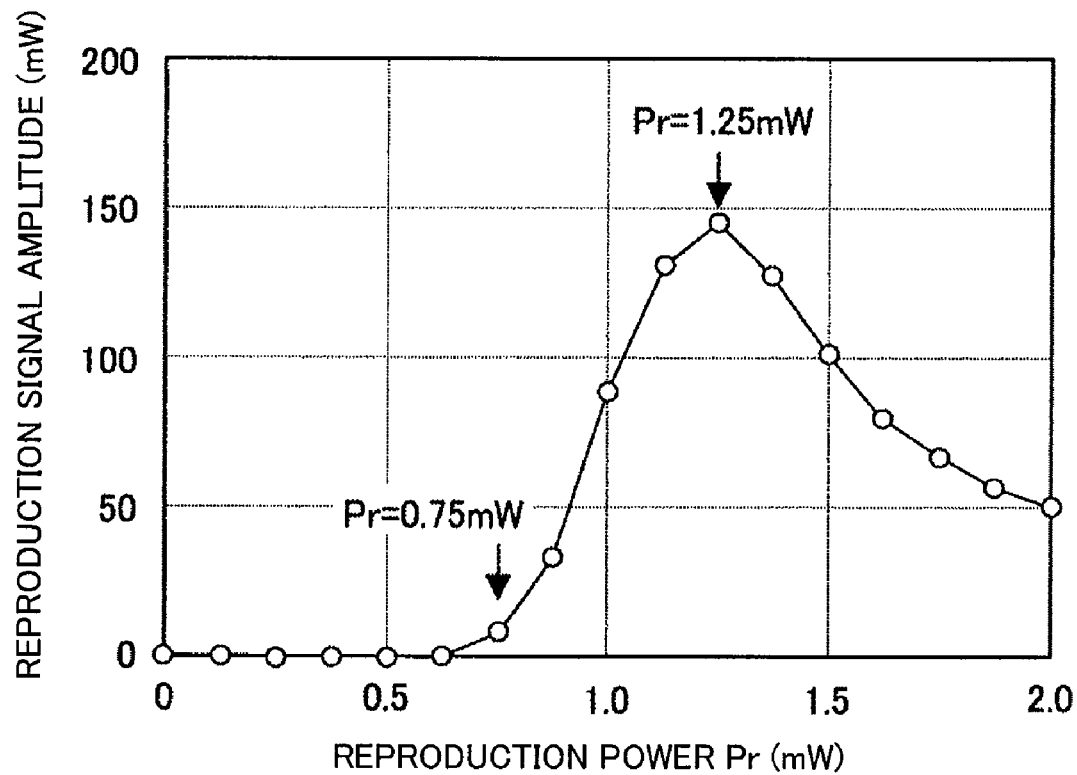
FIG. 1A is a diagram illustrating an exemplary relationship between reproduction signal amplitude and reproduction power in a super resolution region of an optical disk.
Figure 1B:
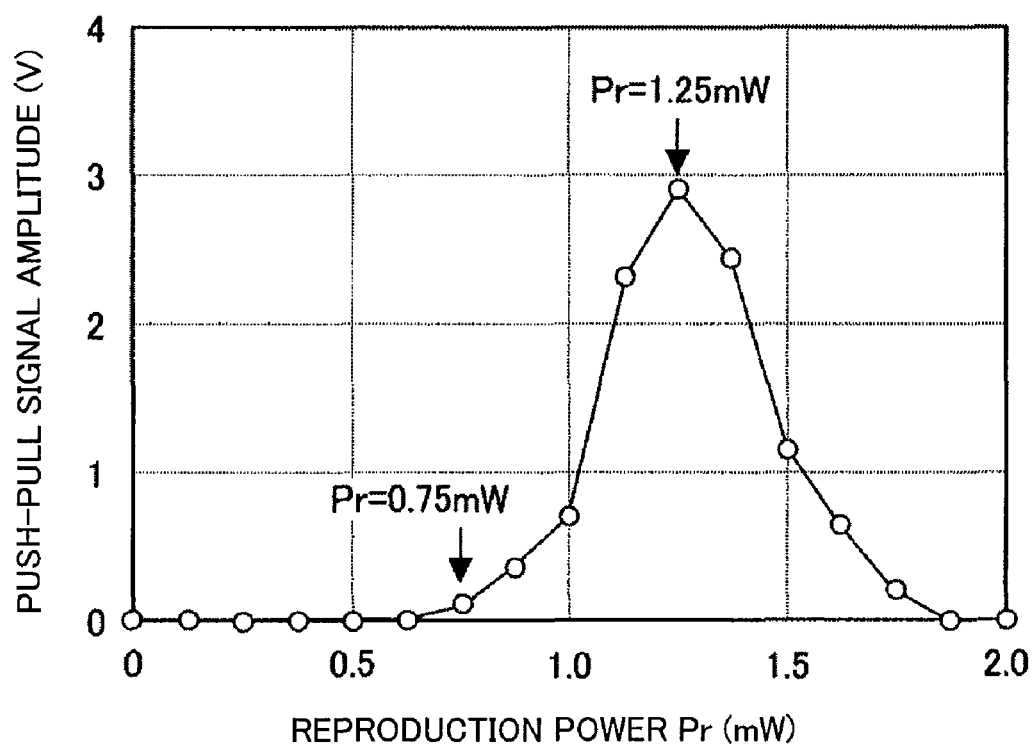
FIG. 1B is a diagram illustrating an exemplary relationship between push-pull signal amplitude and reproduction power in a super resolution region of an optical disk.

A basic configuration of the above-described present invention will now be described before describing preferred embodiments of the present invention. In the following description of the preferred embodiments, a region where information is recorded with pits or marks of a first size, which is smaller than optical resolution, may be referred to as the super resolution region, whereas a region where information is recorded with pits or marks of a second size, which is not smaller than optical resolution, may be referred to as the normal resolution region. When the power of laser irradiation for super resolution region reproduction is a first power, the power of laser irradiation for normal resolution region reproduction is a second power, which is lower than the first power. Further, even when the second power is used to irradiate the super resolution region, the amplitude of a reproduction signal from pits or marks of the first size is substantially zero. Pits or marks of the first size, which are formed in the super resolution region, are usually made of a super resolution substance. A normal resolution method applies to the normal resolution region of a medium and denotes a method of optimum normal resolution region reproduction, whereas a super resolution method applies to the super resolution region of the medium and denotes a method of optimum super resolution region reproduction.

An optical disk is prepared for use with the following preferred embodiments. This optical disk includes a super resolution region and a normal resolution region. A signal representing management information is recorded in the normal resolution region. Before reproducing user information recorded on the optical disk or recording user information on the optical disk, the optical disk drive reproduces the management information to acquire the information necessary for adjusting a reproducing or recording operation. The optical disk drive then adjusts the reproducing or recording operation in accordance with the management information.

When performing a reproducing operation, the optical disk drive moves a laser irradiation position to the information region to be reproduced in accordance with the acquired management information, and makes adjustments for reproducing the information region. When the information region to be reproduced can be reproduced by a conventional optical disk technology, the optical disk drive makes the same reproduction adjustments as conventional ones such as lens tilt and spherical aberration adjustments. When the information region to be reproduced is a super resolution region, the optical disk drive not only makes the same reproduction adjustments as the above-mentioned conventional ones, but also makes reproduction power adjustments in accordance with the acquired management information. By making the above adjustments, the optical disk drive can reproduce the information region in which the user information to be reproduced is recorded, and acquire the user information.

When performing a recording operation, the optical disk drive moves the laser irradiation position to the information region to be recorded and adjusted in accordance with the acquired management information, and makes adjustments for recording user information. In the information region, the optical disk drive performs a test write at a recommended recording power, and makes the same reproduction adjustments as for reproduction in accordance with the quality of a reproduction signal derived from the test write. Next, the optical disk drive performs a test write at a plurality of different recording power levels determined in accordance with the recommended recording power, performs a reproducing operation under adjusted reproduction conditions, and makes recording power adjustments in accordance with the quality of a reproduction signal derived from the test write. By making the above adjustments, the optical disk drive can properly record the user information in the information region for user information recording.

Preferred embodiments of the present invention will now be described with reference to the accompanying drawings. It should be understood that the preferred embodiments are offered by way of example only, and that the present invention is not limited to such preferred embodiments. Further, the following description assumes that a BD format represents a conventional optical disk technology. However, the following description is also applicable to a case where various DVD formats and CD formats are used as a format representing a conventional optical disk technology.

First Embodiment

An exemplary configuration according to a first embodiment of the present invention will now be described. The first embodiment uses an optical disk that records optical disk management information in a normal resolution region and user information in a super resolution region. In other words, the first embodiment uses a read-only optical disk (ROM) constructed so that the normal resolution region and super resolution region coexist in the same recording layer.

Figure 2A:
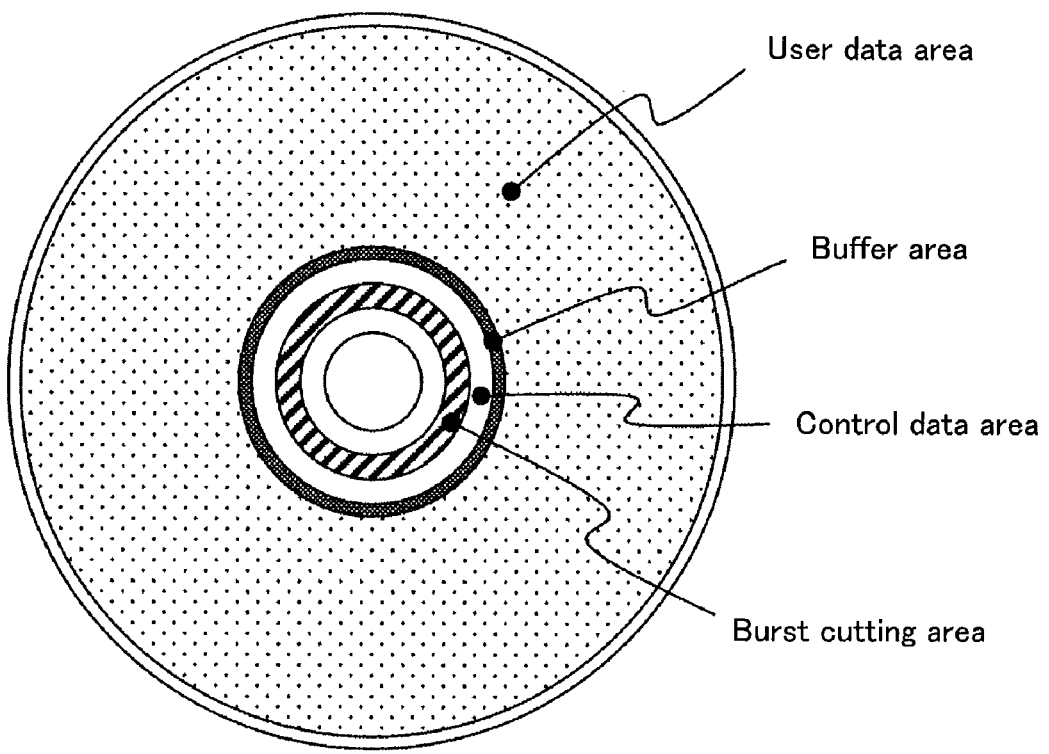
FIG. 2A is a top view illustrating a recording layer of an optical disk according to a first embodiment of the present invention.

FIG. 2A is a top view illustrating a recording layer of the optical disk (medium) according to the present embodiment. FIG. 2B shows specifications for the optical disk recording layer, which is shown in FIG. 2A. The optical disk shown in FIGS. 2A and 2B is a 12 cm diameter ROM type medium having a single information recording layer. The information recording layer includes an information region, which is a region spanning between a radius of 20 mm and a radius of 56 mm.

Four areas are formed in the recording layer of the optical disk shown in FIG. 2A. From the inside to the outside, the four areas are a burst cutting area (BCA) for recording a disk ID and the like, a control data area (CDA) for recording management information, a buffer area (BA) for recording boundary information indicating that a super resolution region is adjacent to the outer circumference of the buffer area, and a user data area (UDA) for recording content, applications, and various other user data in combination with address information. In each area, information is entirely recorded with embossed pits. The super resolution method is used for recording in the user data area only. In all the other areas, information is recorded in compliance with a BD (Blu-ray Disc) standard, which relates to a conventional technology. Therefore, recording pits recorded in the normal resolution region have a track width of 75 nm and a track pitch of 320 nm. In the super resolution region, recording pits are recorded so as to provide a track width of 25 nm and a track pitch of 240 nm. For lasers currently used with a BD optical system, these recording pits are not larger in size than optical resolution.

On the optical disk shown in FIGS. 2A and 2B, the boundary information is recorded with embossed pits. However, this information can also be recorded with a wobbling signal having a land/groove structure. Further, the optical disk shown in FIGS. 2A and 2B is configured so that the width of the BA in the track direction is extremely small (several tracks). However, no problem arises if the BA is wider than several tracks.

In the present embodiment, it is assumed that only the positional information indicating the range of the super resolution region is recorded as the management information to be recorded in the control data area. Therefore, it is necessary that an optical disk drive incorporate a function for presetting a reproduction power appropriate for the optical disk to be reproduced. An exemplary configuration of an optical disk drive capable of reproducing information on the optical disk according to the present embodiment will now be described.

Figure 3:
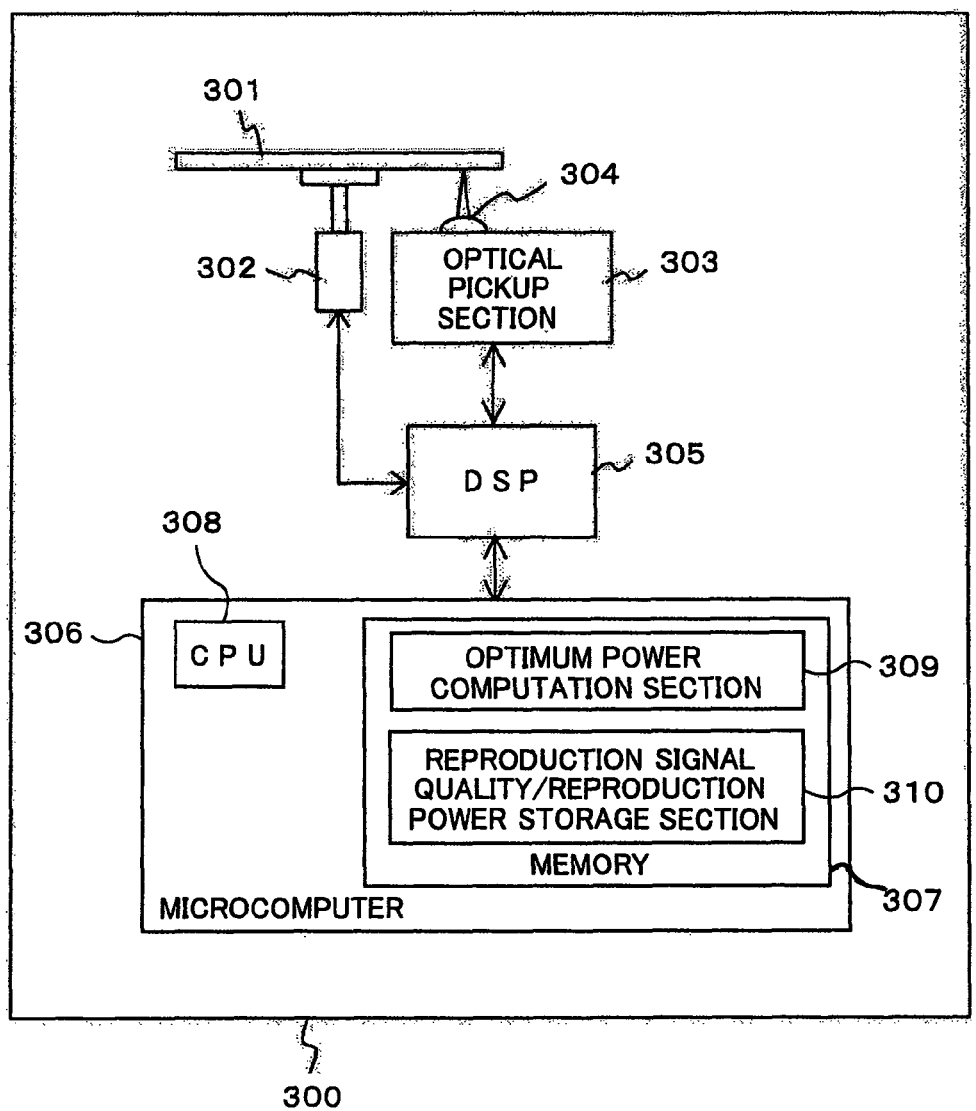
FIG. 3 is a schematic diagram illustrating the overall configuration of an optical disk drive according to the first embodiment.

FIG. 3 shows an exemplary configuration of the optical disk drive according to the present embodiment. The optical disk drive according to the present embodiment includes a spindle motor 302, which forms a disk rotation section for retaining and rotationally driving the optical disk 301 shown in FIGS. 2A and 2B; an optical pickup section 303 for reading information from and writing information onto the optical disk 301; and a control section for providing overall integrated control of the optical disk drive. The control section shown in FIG. 3 includes a digital signal processor (DSP) 305 and a microcomputer 306. The spindle motor 302, which forms a disk rotation section, exercises CLV (constant linear velocity) control or CAV (constant angle velocity) control over the optical disk 301. The optical pickup section 303 faces the optical disk 301, and performs a read/write operation in relation to the optical disk by allowing laser light 304 emitted from a laser diode (LD) (not shown) to fall on the information recording layer through an objective lens (not shown). The LD incorporated in the optical pickup section 303 shown in FIG. 3 has a wavelength of 405 nm. The objective lens incorporated in an optical system of the optical pickup section 303 has a numerical aperture of 0.85. Therefore, the optical pickup section has substantially the same configuration as a BD optical pickup section based on a conventional optical disk technology. The optical pickup section 303 includes spherical aberration correction, focus servo, and tracking servo actuators (not shown). These actuators are driven in accordance with control signals from the DSP 305.

The DSP 305 usually includes an LSI and performs various functions. For example, the DSP 305 functions as an LD driver (LDD), a recording data encoder, and a reproduction signal decoder, exercises servo control over the optical pickup section 303 and rotation control over the spindle motor 302, and stores information. Therefore, the DSP 305 may be called a control section. The microcomputer 306 includes a central processing unit (CPU) 308 for evaluating and processing signals received from the DSP 305, such as a reproduction signal and servo signal, and a storage section (memory unit) 307. The microcomputer 306 feeds various signals back to the DSP 305. The signals fed back to the DSP 305 include those concerning, for instance, the servo actuators and the reproduction power and recording power to be generated in accordance with the evaluations. Software stored in the memory unit will be described in detail later. Although FIG. 3 indicates that the control section is separated into the DSP 305 and microcomputer 306, the DSP 305 and microcomputer 306 may alternatively be integrated into a single LSI chip.

When a signal on the optical disk 301 is to be reproduced, laser light 304 having a reproduction power is emitted from the LD in the optical pickup section 303. During a reproduction process, a reproduction signal output from the optical pickup section 303 is supplied to the DSP 305, decoded by a reproduction signal processing section and a decoder in the DSP 305, and output as reproduction data. In this instance, the DSP 305 generates a focus error signal and a tracking error signal in accordance with the signal supplied from the optical pickup section 303, and supplies the generated signals to the focus servo and tracking servo actuators in the optical pickup section 303 to control a focus servo and a tracking servo. The DSP 305 also controls a reproduction optical system, which includes a lens tilt actuator and a spherical aberration correction actuator, in accordance with the signal supplied from the optical pickup section 303. In this instance, the DSP 305 controls a reproduction power value and servo signals by using the management information recorded on the optical disk 301 and signals generated by the microcomputer 306 in accordance with an optical disk eccentricity signal, a rotation signal, a reproduction signal, and other signals supplied from the optical pickup section 303.

When a signal is to be recorded onto the optical disk 301, the encoder in the DSP 305 encodes recording data to obtain a recording signal. An LDD drive signal is then generated in accordance with the recording signal and supplied to the LD in the optical pickup section 303 to record the recording signal. In this instance, a recording power value is determined in accordance, for instance, with the management information recorded on the optical disk 301 and the result obtained when the microcomputer 306 evaluated a reproduction signal derived from a test write. The test write is an operation that is performed before signal recording to record information at a plurality of different recording power levels in a drive test zone (DTZ), which is a test write region of the optical disk 301, and determine the optimum recording power in accordance with the reproduction signal quality of such recordings.

If a disk film needs to revert to its initial state by means of laser irradiation before a recording or reproducing operation on the optical disk 301, the LD achieves such initialization by emitting laser light 304 having an initialization power. If the optical disk 301 is a rewritable medium, the LD achieves signal erasure by emitting laser light 304 having an erasure power for restoring a signal-recorded region on the optical disk 301 to a non-recorded state.

The reproducing and recording operations of the optical disk drive shown in FIG. 3 will now be described with reference to a flowchart of FIG. 4. The flowchart of FIG. 4 illustrates major steps of an exemplary procedure for recording and reproduction adjustments that are made in the optical disk drive shown in FIG. 3.

Figure 4:
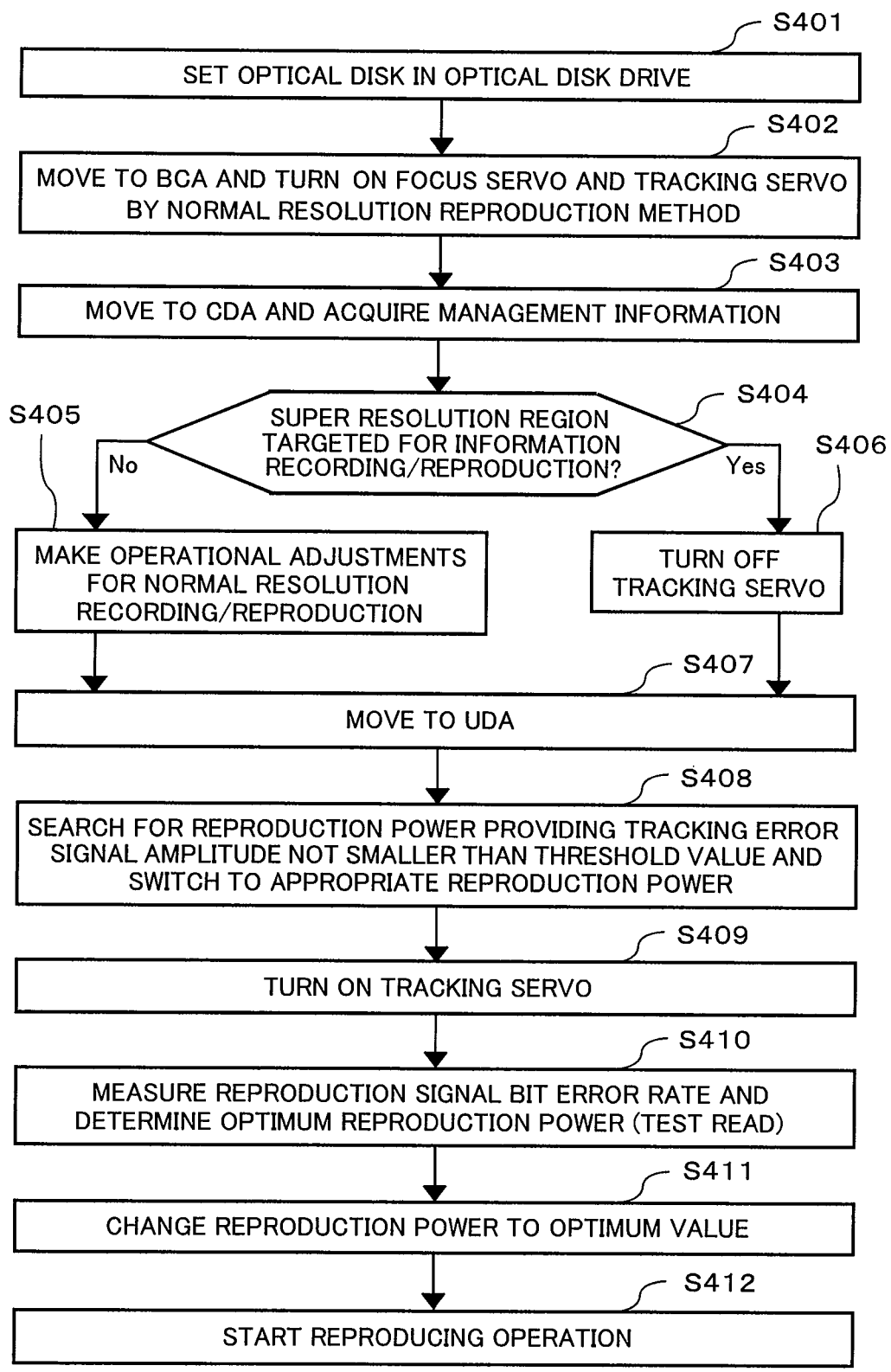
FIG. 4 is a flowchart illustrating how reproduction power control is exercised by the optical disk drive according to the first embodiment.

Referring to FIG. 4, a prepared optical disk was set in the optical disk drive (step 401), and subjected to CLV rotation at a linear velocity of 4.92 m/s. After the control section exercised control to move a laser irradiation position to the BCA of the recording layer, the focus servo was turned ON with laser light emitted at a reproduction power of 0.3 mW, which is a typical recording power for the normal resolution method. Then, a push-pull signal, which is a tracking error signal, was obtained at appropriate amplitude. The reason was that the BCA and CDA were BD-compliant information regions, and that a track pitch of 320 nm was not smaller than the optical resolution of the optical pickup section according to the present embodiment. Thus, the tracking servo was subsequently turned ON by a push-pull method (step 402).

Next, the control section moved the reproduction position of the optical pickup section 303 to the CDA of the recording layer, and reproduced a signal recorded in the CDA to acquire the management information about the optical disk (step 403). Next, step 404 was performed to judge whether a user data region, which was a reproduction target, was recorded in a super resolution region or a normal resolution region. For super resolution region, the next step is 406; for normal resolution region, the next step is 405 (make operational adjustments for normal resolution recording/reproduction). The acquired management information indicated that the user data region was recorded in the super resolution region. Further, the address of user data indicated that the user data was recorded in a region spanning between a radius of approximately 24 mm and a radius of approximately 56 mm. Thus, a control flow, which succeeds step 404, was subsequently executed.

When the tracking servo was turned OFF (step 406) to move the optical pickup section to a target address in the UDA (step 407) under the control of the control section, the amplitude of the push-pull signal became very small. The reason was that the track pitch of the super resolution region was as small as 240 nm and smaller than the optical resolution of the optical disk drive. Thus, the reproduction power was gradually increased in appropriate increments until a push-pull signal having an adequate strength for tracking was obtained (step 408). The reproduction power was controlled by the DSP 305. The microcomputer 306 judged whether a threshold value was satisfied by the obtained push-pull signal. More specifically, the CPU 308 formulated such a judgment by executing a judgment program stored in the memory unit 307. To perform the above-described process, the microcomputer 306 (e.g., the memory unit 307 or a register in the CPU 308) stores threshold value information (2 V in the present embodiment) and increment information (0.12 mW in the present embodiment) for judging whether tracking is achievable.

Figure 5:
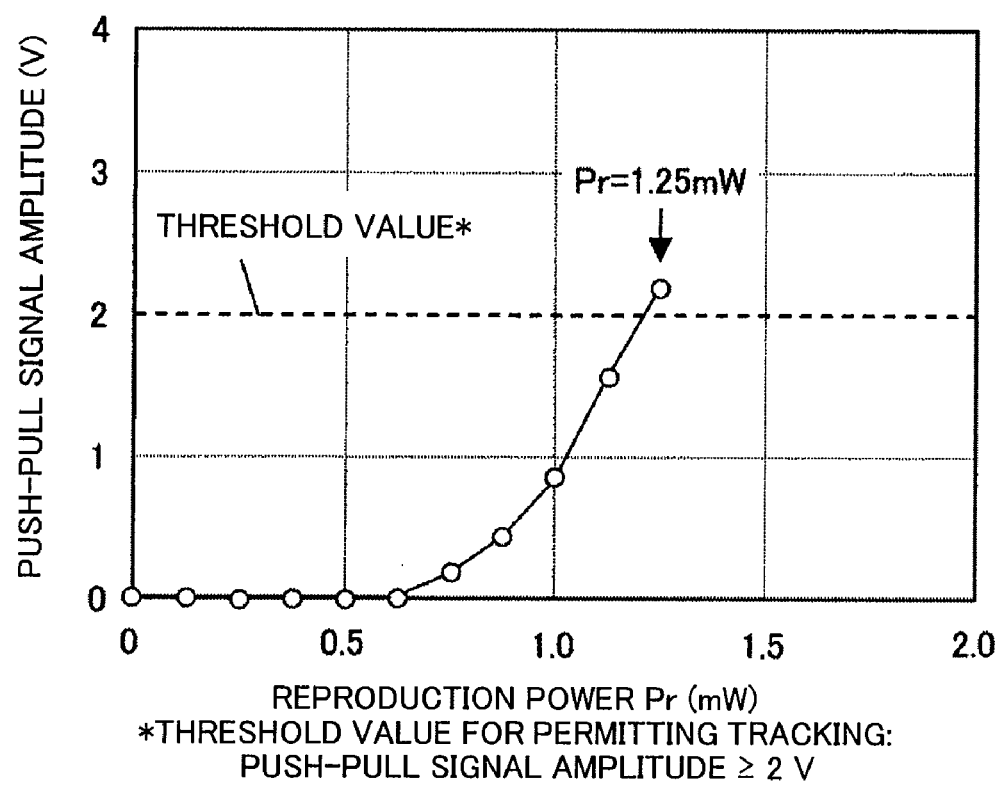
FIG. 5 is a diagram illustrating the relationship between push-pull signal amplitude and reproduction power that occurs when step 408 in FIG. 4 is performed.

FIG. 5 shows the results obtained when step 408 was performed. This figure indicates that the reproduction power increased from 0.3 mW, which was set as a reproduction power for the normal resolution region. The figure also indicates that the amplitude of the push-pull signal increased to permit tracking at a reproduction power of 1.25 mW.

Next, the tracking servo was turned ON (step 409) to perform step 410, which is a reproduction power optimization step. Step 410 is performed to read a predetermined pattern at different reproduction power levels, calculate a bit error rate (bER), determine a reproduction power level that minimizes the bit error rate, and set the determined reproduction power level as an optimum value. It represents a concept that corresponds to the "test write" performed during recording operation control. This concept can be temporarily referred to as a "test read". Reproduction power control was exercised by the DSP 305. The bit error rate was calculated by the microcomputer 306. As shown in FIG. 3, the memory unit 307 in the microcomputer 306 stores a software program for calculating reproduction signal quality (bER) and a software program for memorizing the relationship between bER and reproduction power. As the CPU 306 executes these software programs, functional blocks named "optimum power computation section 309" and "reproduction signal quality/reproduction power storage section 310" are formed in the microcomputer 306. For the sake of convenience, FIG. 3 indicates that these functional blocks are formed in the memory unit 307.

To perform the above computation process, the microcomputer 306 stores information about an incremental value for changing the reproduction power (0.125 mW in the present embodiment) and information determining the upper-limit reproduction power for a test read (1.6 mW in the present embodiment). The upper-limit reproduction power for the present embodiment was such that the reproduction power adjustments were considered complete if the reproduction power minimizing the bER of a reproduction signal remained unchanged when the reproduction power minimizing the bER was increased in six increments. The upper-limit reproduction power may be determined by adding an appropriate amount of power to the minimum reproduction power determined in step 408 (the reproduction power for acquiring a push-pull signal that permits tracking during super resolution reproduction) instead of a numerical value. For example, the additional amount for determining the upper-limit reproduction power in the present embodiment is 1.6 mW−1.25 mW=0.35 mW. Information about this additional amount (0.35 mW) is to be stored in the memory unit 307 or in a register in the CPU 308. As the optimum additional amount may vary with optical disk characteristics and specifications, the information about the additional amount may alternatively be recorded in a management region of the optical disk.

Figure 6:
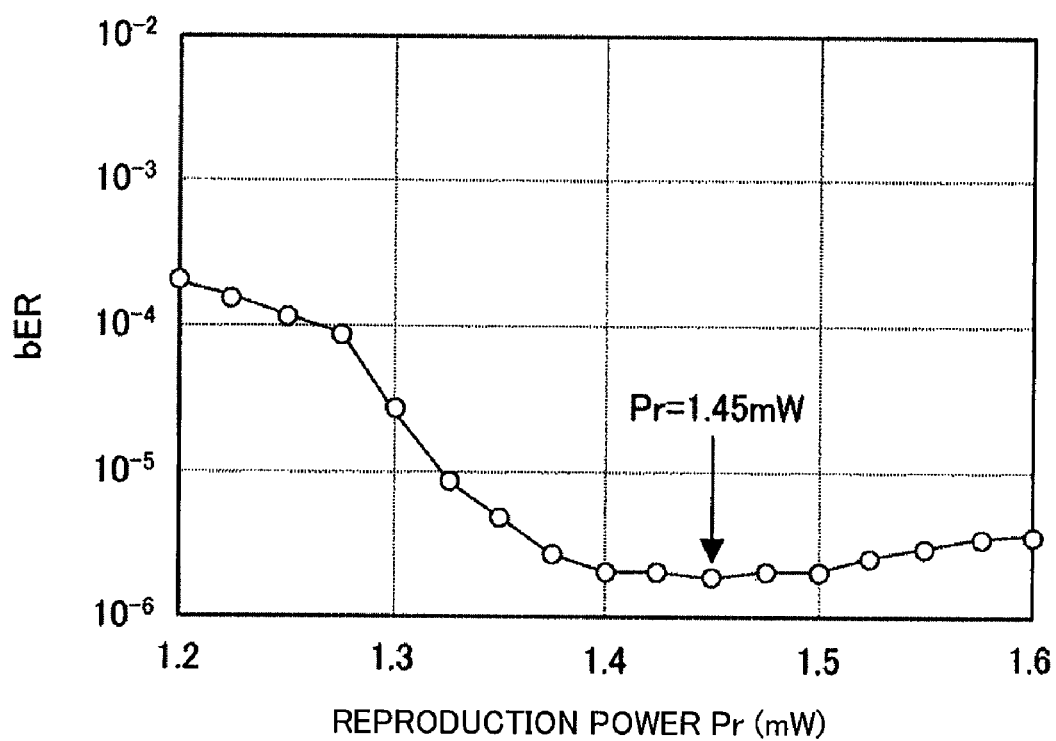
FIG. 6 is a diagram illustrating the relationship between reproduction signal bit error rate and reproduction power Pr that occurs when step 410 in FIG. 4 is performed.

FIG. 6 shows the results of measurements that were made in step 410 to determine the relationship between reproduction power Pr and the bit error rate (bER) of a reproduction signal. The measurement results revealed that the optimum reproduction power for the super resolution region, namely, the reproduction power value minimizing the bit error rate, was 1.45 mW. The microcomputer 306 transmitted the information about the optimum reproduction power (1.45 mW), which was derived from the measurements, to the DSP 305, then the DSP 305 changed the reproduction power in accordance with the transmitted information (step 411).

When the adjustments to be made before the start of a reproducing operation were completed as described above, step 412 was performed to start reproducing information in the UDA. As a result, satisfactory reproduction signal quality (bER<$8 \times 10^{-6}$) was achieved within the entire UDA of the recording layer. During the above-described process, which is illustrated by the flowchart of FIG. 4, reproduction adjustments, such as lens tilt adjustments and spherical aberration corrections, were also made as needed. However, such adjustments are not depicted or otherwise described because they are made in the same manner as when a conventional optical disk technology is used.

The above description assumes that a single-layer recording medium, which has only one recording layer, is used. However, it should be noted that the control operation performed for reproduction is basically the same when a multiple-layer recording medium, which has a plurality of stacked recording layers, is used. When a multiple-layer recording medium is used, a jump occasionally occurs between recording layers. However, when such an inter-layer jump occurs, the LD's output is decreased to 0.3 mW, which was a power level used in step 402. This reproduction power is then used to read the management region of a jump-destination recording layer. Subsequently, the same steps as those in the flowchart of FIG. 4 are sequentially performed to reproduce a jump-destination UDA. The present embodiment assumes that the modulation regulations for the information to be recorded in the super resolution region and normal resolution region are both based on a 1-7 encoding scheme. However, it goes without saying that no particular problem occurs if different modulation regulations are observed.

As described above, it has been verified that reproduction adjustments can be properly made to reproduce user information at satisfactory reproduction signal quality when the management information about an optical disk is recorded with a signal reproducible by a reproduction method based on a conventional optical disk technology.

Second Embodiment

A second embodiment of the present invention will now be described. Although the second embodiment has the same structure as the first embodiment, an exemplary configuration of the second embodiment will be described below on the assumption that a recommended reproduction power value for the super resolution region is stored in the management region of an employed optical disk. The optical disk according to the second embodiment will not be described here because it has exactly the same structure as the optical disk shown in FIGS. 2A and 2B. The optical disk drive according to the second embodiment has the same structure as the optical disk drive shown in FIG. 3, but does not incorporate software programs such as the "optimum power computation section" and "reproduction signal quality/reproduction power storage section".

Figure 7:
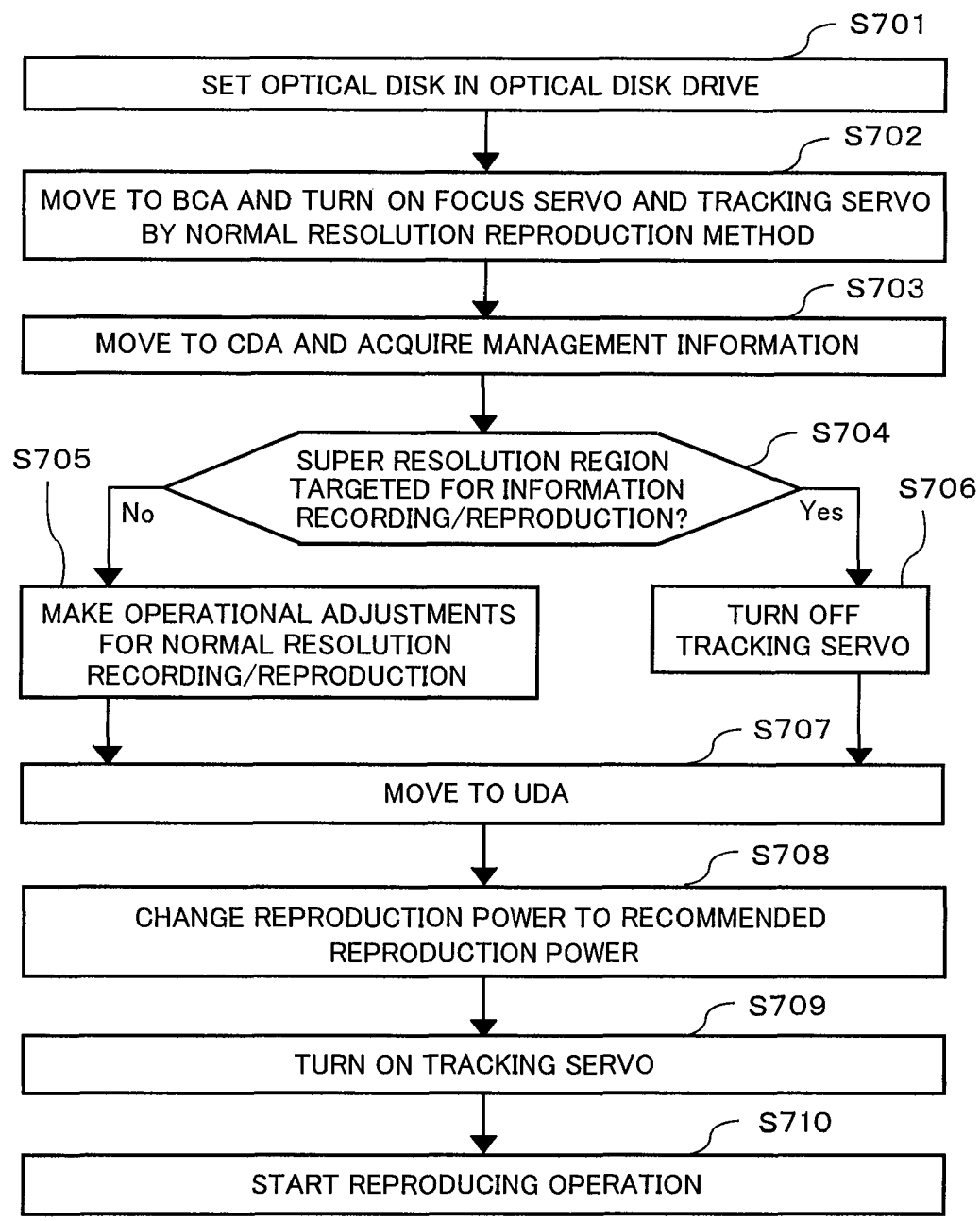
FIG. 7 is a flowchart illustrating how reproduction power control is exercised by an optical disk drive according to a second embodiment.

FIG. 7 is a flowchart illustrating an operation that the optical disk drive according to the present embodiment performs during reproduction. Steps 701 and 702 will not be described here because they are the same as those of the first embodiment.

Step 703 was performed to acquire control information recorded in the management region (CDA). The address information about the normal resolution region (a BD-compliant region in the present embodiment), the address information about the super resolution region, and a recommended reproduction power value for the super resolution region are recorded in the CDA of the optical disk according to the present embodiment. Upon completion of step 706, which was performed after termination of judgment in step 704 indicating super resolution region, or upon completion of step 705, which was performed after termination of judgment in step 705 indicating normal resolution region, step 707 was performed to move the irradiated region of the LD to the UDA. Step 708 was then performed to change the reproduction power to a recommended reproduction power of 1.5 mW, which was stored in the CDA. Next, the tracking servo was turned ON (step 709) to start a reproducing operation (step 710). As a result, satisfactory reproduction signal quality was achieved within the entire UDA (the resulting bit error rate was substantially lower than $8 \times 10^{-6}$).

The optical disk drive according to the present embodiment does not perform a test read. Therefore, it does not always perform a reproducing operation at a reproduction power that minimizes the bit error rate. It means that the optical disk drive according to the present embodiment does not perform a reproducing operation in its best state. However, when the quality of the optical disk is high so that the bit error rate does not significantly vary with reproduction power, the optical disk drive according to the present embodiment is good enough to perform proper reproducing operations. For example, FIG. 6, which depicts the first embodiment, indicates that the bit error rate rarely varies at a reproduction power of approximately 1.4 mW to 1.5 mW. In such an instance, a sufficient reproduction power margin is allowed for the bit error rate. Therefore, reproducing operations can be performed by the optical disk drive according to the present embodiment, which controls reproducing operations in accordance with disk information. The above-described high disk quality can be achieved, for instance, by a ROM. In addition, as the optical disk drive according to the present embodiment does not perform a test read, it is advantageous in that it reduces the wait time between normal resolution region reproduction and super resolution region reproduction.

As described above, the present embodiment makes it possible to make proper recording adjustments or reproduction adjustments without adding a complicated recording/reproduction adjustment scheme to an optical disk drive.

Third Embodiment

The optical disk described in connection with the first and second embodiments is formatted so that the normal resolution region and super resolution region coexist in the same recording layer. However, the optical disk that uses the super resolution method to achieve recording and reproduction may have various configurations other than those described in connection with the first and second embodiments. A third embodiment of the present invention will be described below in connection with super resolution optical disks having different formats.

(1) First Format

Figure 8A:
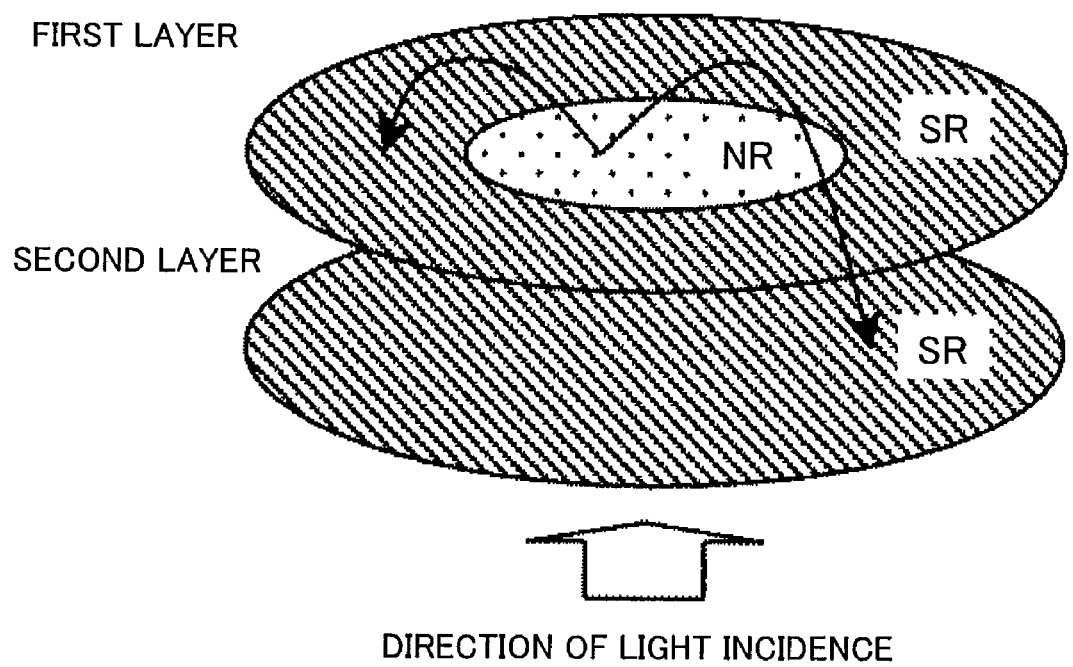
FIG. 8A is a perspective view schematically illustrating the recording layer configuration of an optical disk of a first format according to a third embodiment.

The configuration of an optical disk of a first format will now be described with reference to FIGS. 8A to 8C. FIG. 8A is a schematic diagram illustrating the positional relationship between data regions of the optical disk of the first format. The optical disk shown in FIG. 8A is a ROM type medium having two information recording layers. The first layer of the optical disk includes a normal resolution region, which contains the management information, and a super resolution region, which corresponds to a user data area (UDA), whereas the second layer is entirely used as a super resolution region. As shown in FIG. 8A, the first layer is defined as the information recording layer that is positioned rearward as viewed from the light incidence side, whereas the second layer is defined as the information recording layer that is positioned forward as viewed from the light incidence side. In the Figure, the symbol "NR" is used to indicate a normal resolution region, whereas the symbol "SR" is used to indicate a super resolution region. As the second layer does not contain a management region, it can be entirely used as a UDA. Therefore, the format efficiency of the optical disk according to the third embodiment is higher than when recording layers described in connection with the first and second embodiments are merely stacked to form a multiple-layer medium.

Figure 8B:
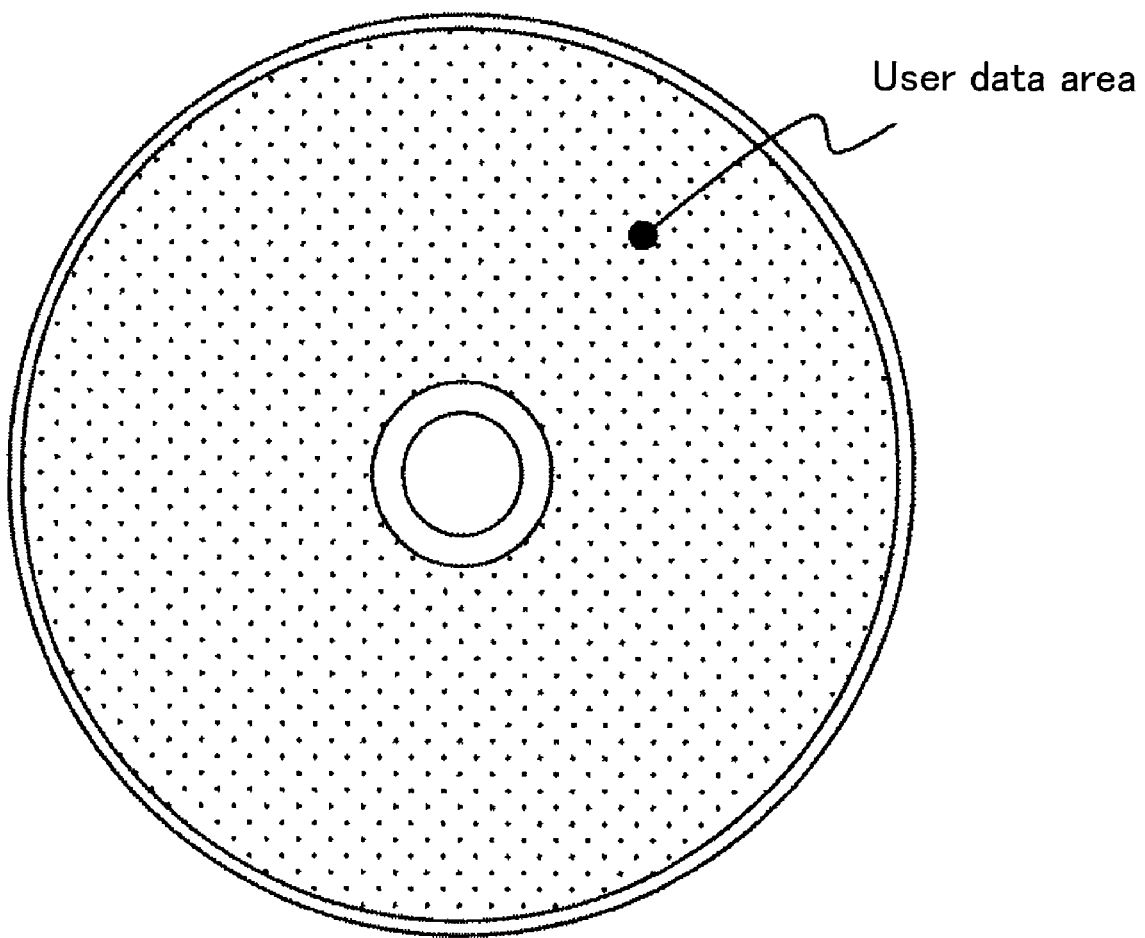
FIG. 8B is a top view illustrating a recording layer that corresponds to a second layer shown in FIG. 8A.

FIG. 8B is a top view illustrating the second recording layer of the optical disk shown in FIG. 8A (the top view of the first recording layer is omitted because it is the same as FIG. 2A). FIG. 8C shows specifications for the optical disk shown in FIG. 8A.

Information recorded on the optical disk of the first format can be reproduced by both the optical disk drives according to the first and second embodiments. However, the optimum reproduction power varies with the layer. Therefore, each time an inter-layer jump occurs during a reproducing operation, it is necessary to exercise reproduction power control as indicated in FIG. 4 or 7. Thus, the CDA records not only the address information indicating the range of the super resolution region but also the address information indicating the range of the UDA formed in each recording layer. The optical disk drive stores these items of address information in the microcomputer 306 or DSP 305, and judges during UDA reproduction whether light spot movement is within the same recording layer. If the light spot moves from one recording layer to another, reproduction power control is exercised in accordance with the flowchart shown in FIG. 4 or 7. Therefore, when reproduction power control is exercised in accordance with the flowchart shown in FIG. 7, the recommended reproduction power values for the first and second layers are both recorded in the CDA of the first layer as the management information. When reproduction power control is exercised in accordance with the flowchart shown in FIG. 4 to reproduce information in the same recording layer for a second or subsequent time, there is no need to repeat a search for the optimum reproduction power value because the initially determined optimum reproduction power value can be used.

(2) Second Format

Figure 9A:
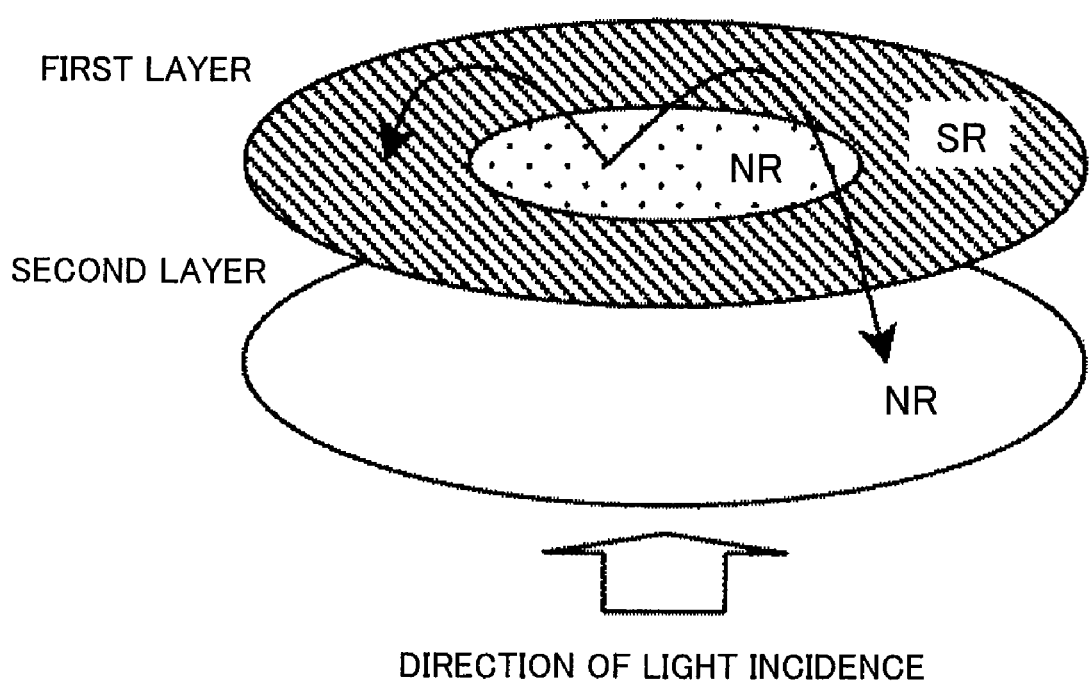
FIG. 9A is a perspective view schematically illustrating the recording layer configuration of an optical disk of a second format according to the third embodiment.

In marked contrast to the optical disk shown in FIGS. 8A to 8C, the optical disk of a second format, which is shown in FIGS. 9A and 9B, is configured so that the second layer is entirely used as a normal resolution region, whereas the first layer includes a normal resolution region, which contains the management information, and a super resolution region, which corresponds to a user data area (UDA). As the second layer includes a normal resolution UDA with the management information formed in the normal resolution region, the optical disk of the second format includes a UDA from which information can be read (into which information can be written if the optical disk is of a recordable type) without fail by an optical disk drive based on a conventional technology. In other words, when the optical disk has the second format, downward compatibility is provided as information in the CDA and information in the UDA can be both read. In the first or second embodiment, the optical disk drive that does not support a super resolution reproduction capability can merely judge that it cannot "read" the UDA of the optical disk.

The optical disk of the second format is configured so that the UDA is formed in both the normal resolution region and super resolution region. Therefore, the reproduction power needs to be changed as appropriate depending on the light spot movement destination. An operation of the optical disk drive capable of reproducing information on the optical disk of the second format will now be described with reference to FIGS. 10A and 10B. It is assumed that the optical disk drive has the same hardware configuration as shown in FIG. 3.

When the optical disk of the second format is set in the optical disk drive (step 1001), normal resolution reproduction control is exercised (step 1002) to read management information by reproducing information in the management region (step 1003). These steps are the same as with the optical disk drive according to the first embodiment. The optical disk of the second format records the management information that includes the address information indicating the range of the UDA in the first layer, the address information indicating the range of the UDA in the second layer, a recommended reproduction power value for the UDA in the first layer, the incremental value information about reproduction power for a test read, and the information about the additional amount for the upper limit value for a test read. Various items of read management information are stored in the memory unit in the microcomputer 306.

Step 1004 is performed to judge in accordance with the read management information whether the light spot is about to move to a super resolution region. If the light spot is about to move to a super resolution region, step 1006 is performed, as is the case with the first embodiment, to turn OFF the tracking servo and move the light spot to the UDA in the super resolution region (the first layer when the second format is employed). After the light spot is moved to its destination, step 1008 is performed to read an appropriate region in the UDA at the recommended reproduction power recorded in the CDA. Next, step 1009 is performed to judge whether detected push-pull signal strength has reached a threshold value that permits a tracking servo operation. If the detected push-pull signal strength has not reached the threshold value, steps 1008 to 1010 are performed to search for an initial reproduction power value until the threshold value is reached, by using the recommended value as a starting point and by using the incremental value information recorded in the management region. When the threshold value is reached, the tracking servo is turned ON (step 1011). Next, a test read is performed (step 1012) to determine an optimum reproduction power value. After the optimum reproduction power value is determined, the reproduction power is changed to the optimum value (step 1013). A reproducing operation is then started (step 1014) after making optical system adjustments and exercising general reproduction control.

If, on the other hand, the light spot is about to move to a region other than the super resolution region, normal resolution reproduction control is exercised (step 1005) to start a reproducing operation (step 1014).

Meanwhile, when a reproducing operation is conducted subsequently to step 1014, the need for a seek operation or other operation for moving the light spot over a long distance may arise (step 1015). In such an instance, the optical disk drive according to the present embodiment can function to judge whether inter-layer light spot movement is required. This function is exercised when the CPU 308 executes a program for collating the address of the light spot movement destination with the address range of the UDA in each recording layer.

If the above-described event occurs in step 1015, the optical disk drive according to the present embodiment performs step 1016 to judge whether inter-layer light spot movement is required. If no such inter-layer light spot movement is required, the optical disk drive moves the light spot within the same recording layer and continuously performs the reproducing operation under the same reproduction conditions (step 1018). If, on the other hand, inter-layer light spot movement is required, the optical disk drive judges whether a super resolution or normal resolution recording method is used at a light spot movement destination (step 1017). If a normal resolution recording method is used at the light spot movement destination, the optical disk drive exercises general reproduction control (step 1019), for instance, to make optical system adjustments, turns OFF the tracking servo, moves the light spot to a target layer, and then starts a reproducing operation (step 1028). If, on the other hand, a super resolution recording method is used at the light spot movement destination, the optical disk drive sequentially performs steps 1020 to 1027, and then proceeds to step 1028 to resume the reproducing operation in the target recording layer with the reproduction power reset to the optimum value. The above steps will not be redundantly described because they are the same as steps 1006 to 1014. If inter-layer light spot movement is demanded again (step 1029), steps 1016 and beyond are repeated. When inter-layer light spot movement is about to occur for a second or subsequent time, the management region need not be read because the information in the management region is already loaded into the memory unit 307 of the optical disk drive. Further, in marked contrast to the flowchart shown in FIG. 4, which depicts the first embodiment, the flowcharts shown in FIGS. 10A and 10B indicate that steps 1008 and 1022 are performed with the recommended reproduction power value. Therefore, it is highly probable that the queries in steps 1009 and 1023 are immediately answered "YES". Therefore, it is virtually unnecessary to repeat steps 1010-1008 and steps 1024-1022, which constitute a trial-and-error sequence for acquiring a reproduction power for turning ON the tracking servo. Thus, the time required for searching for the optimum reproduction power value can be reduced accordingly. Further, as the position of the recommended reproduction power value recorded in the management region can be used as the index for initiating a reproduction power search, it is possible to reduce the risk of damaging the management information by irradiating the management region at an improper reproduction power level during the reproduction power search.

(3) Third Format

Figure 11A:
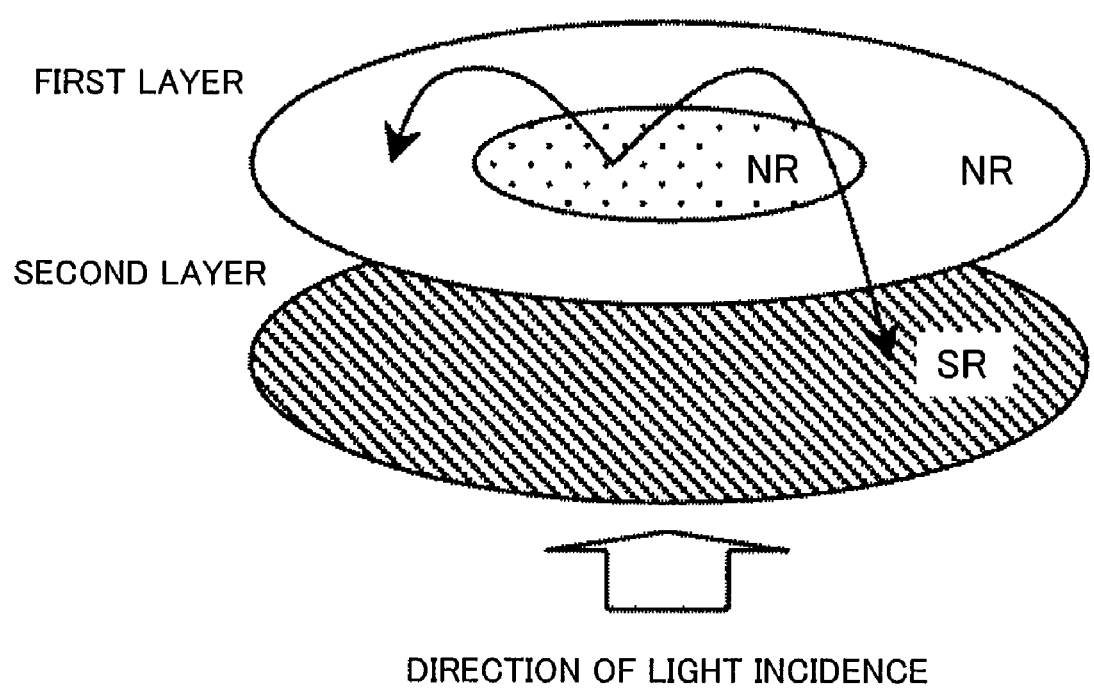
FIG. 11A is a perspective view schematically illustrating the recording layer configuration of an optical disk of a third format according to the third embodiment.
Figure 11B:
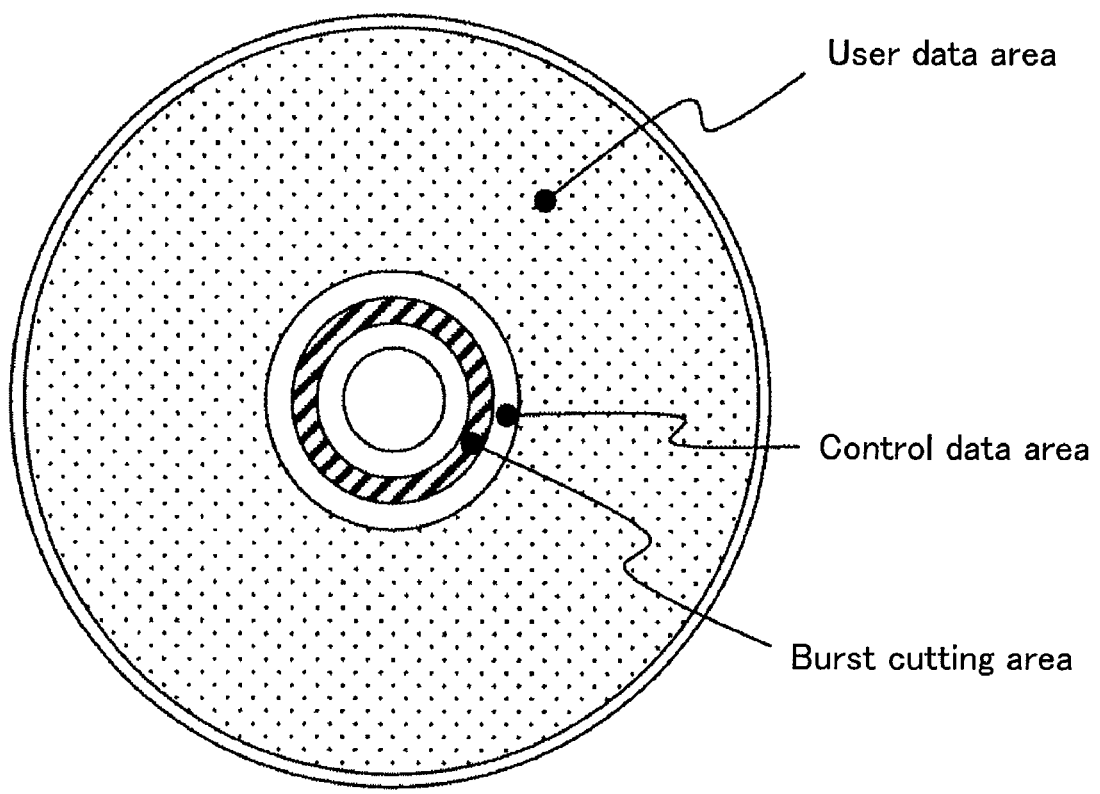
FIG. 11B is a top view illustrating a recording layer that corresponds to a first layer shown in FIG. 11A.

The configuration of the optical disk of a third format will now be described with reference to FIGS. 11A to 11C. The optical disk shown in FIG. 11A is a ROM type medium having two information recording layers. The entire surface of a first layer of the optical disk is used as a normal resolution region so that its CDA and UDA are formed by a normal resolution method, whereas the entire surface of a second layer is used as the UDA of a super resolution region. FIG. 11B is a top view illustrating the first recording layer of the optical disk shown in FIG. 11A (the top view of the second recording layer is omitted because it is the same as FIG. 8B). FIG. 11C shows specifications for the optical disk shown in FIG. 11A. The external view of the first recording layer of the third format is substantially the same as that of the recording layer shown in FIG. 2A. However, as the BCA, CDA, and UDA are formed in the normal resolution region, the buffer area (BA), which records the information about the boundary between the super resolution and normal resolution regions, is not required. Therefore, the optical disk of the third format is advantageous in that it exhibits slightly higher format efficiency than an optical disk having a recording layer in which a super resolution region and a normal resolution region coexist.

Figure 10A:
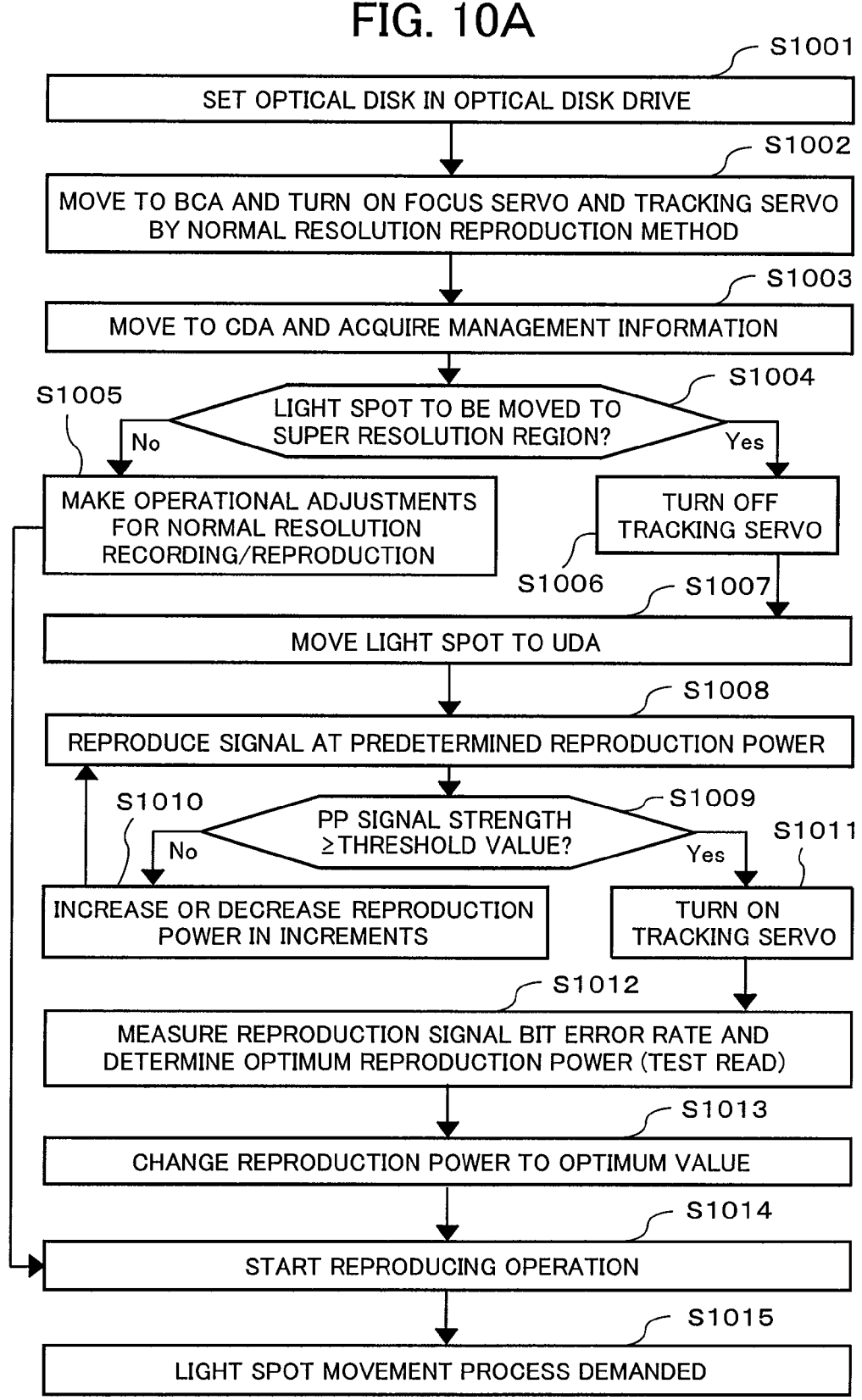
FIG. 10A is a flowchart illustrating how reproduction control is exercised to reproduce information recorded on an optical disk of the second format according to the third embodiment.
Figure 10B:
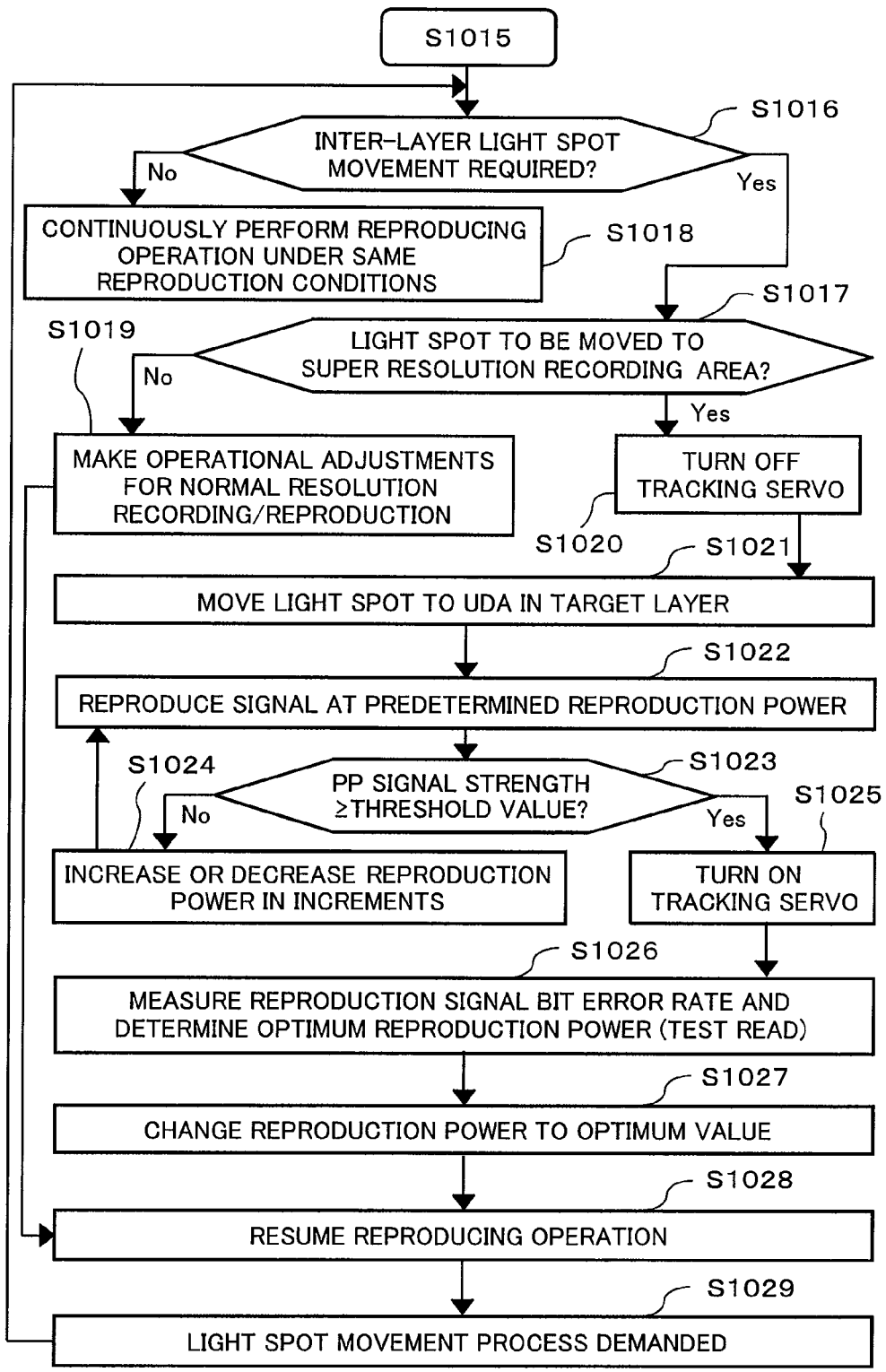
FIG. 10B is a flowchart illustrating how reproduction control is exercised to reproduce information recorded on an optical disk of the second format according to the third embodiment.

The optical disk of the third format is similar to an optical disk of the second format in that downward compatibility is maintained because the disk has a UDA that a conventional optical disk drive can access to read information. It should be noted that information recorded on the optical disk of the third format can be reproduced by an optical disk drive that exercises control as indicated in the flowcharts of FIGS. 10A and 10B.

(4) Fourth Format

Figure 12A:
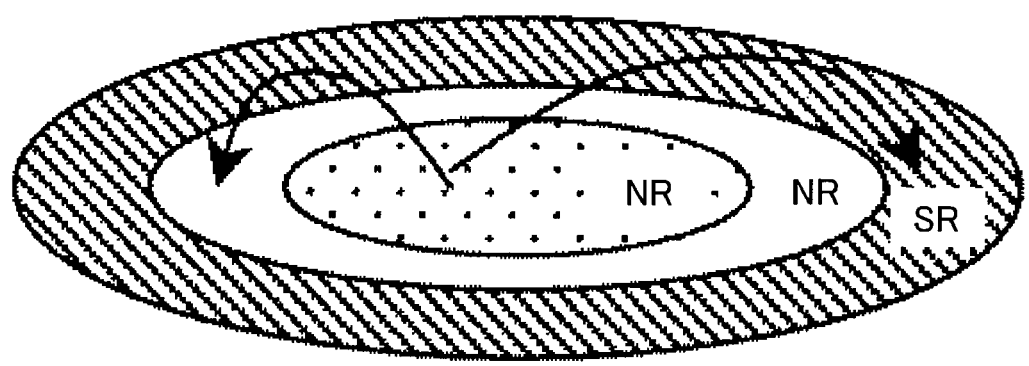
FIG. 12A is a perspective view schematically illustrating the recording layer configuration of an optical disk of a fourth format according to the third embodiment.
Figure 12B:
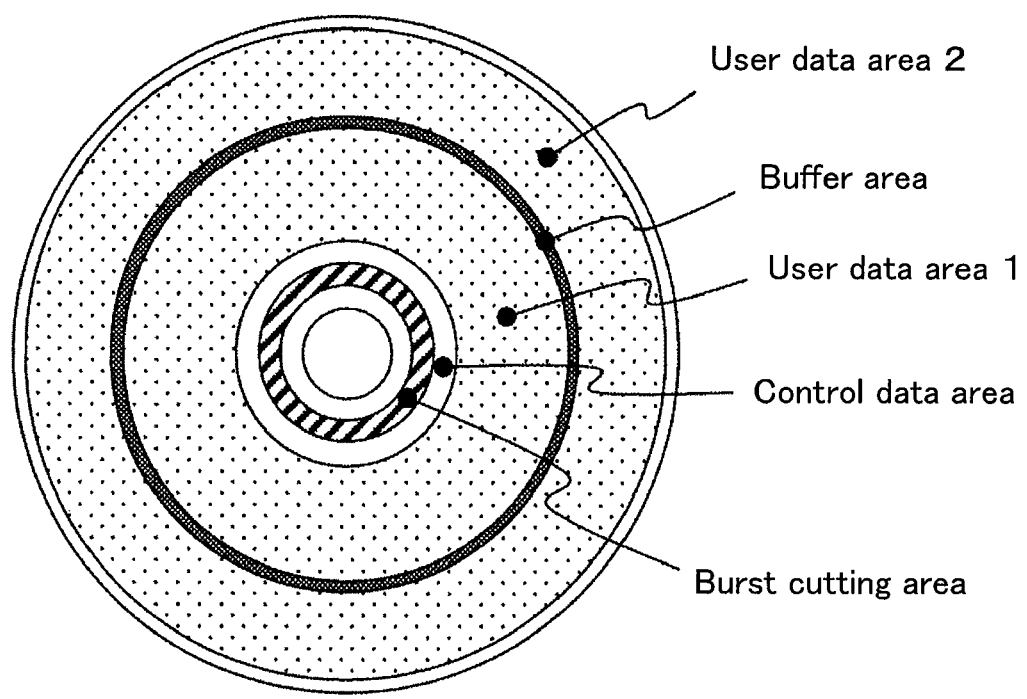
FIG. 12B is a top view illustrating a recording layer shown in FIG. 12A.

The configuration of the optical disk of a fourth format will now be described with reference to FIGS. 12A to 12C. The optical disk of the fourth format is configured so that its recording layer includes a UDA for a normal resolution region and a UDA for a super resolution region. FIG. 12A is a schematic diagram illustrating the configuration of the recording layer. FIG. 12B is a top view of the optical disk shown in FIG. 12A. FIG. 12C shows specifications for each region. Although only an optical disk having a single recording layer is shown in FIGS. 12A to 12C, an optical disk of the fourth format can be a multilayered medium. Information recorded on an optical disk of the fourth format can also be reproduced by an optical disk drive that exercises control as indicated in the flowcharts of FIGS. 10A and 10B. However, the optical disk of the fourth format has UDAs that exist in the same recording layer and use different recording methods. Therefore, whether a reproduction power search should be conducted cannot be judged by checking whether inter-layer light spot movement is demanded. Consequently, it is necessary to judge whether the light spot is about to move to a super resolution or normal resolution region, and then judge in accordance with the obtained judgment result whether reproduction conditions need to be set up again.

As described above, the present embodiment can implement a super resolution optical disk that exhibits high format efficiency. Particularly, the use of the second, third, or fourth format, which provides a UDA for a normal resolution method and a UDA for a super resolution method, makes it possible to implement a super resolution optical disk that maintains downward compatibility. Thus, the present embodiment can implement an optical disk that serves a variety of applications, for instance, by changing the recording region in accordance with the type of content.

Fourth Embodiment

A fourth embodiment of the present invention will now be described in connection with a configuration for using an optical disk drive with a recordable (R-type) optical disk of the first format, which has been described in connection with the third embodiment.

Figure 13A:
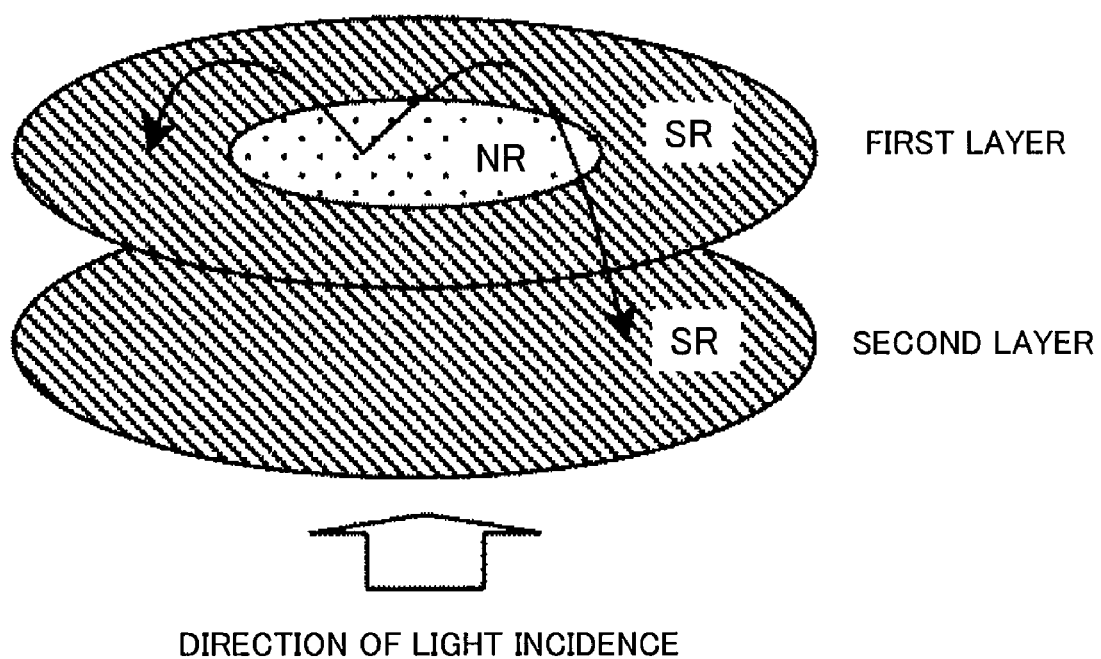
FIG. 13A is a perspective view schematically illustrating the recording layer configuration of an optical disk according to a fourth embodiment.
Figure 13B:
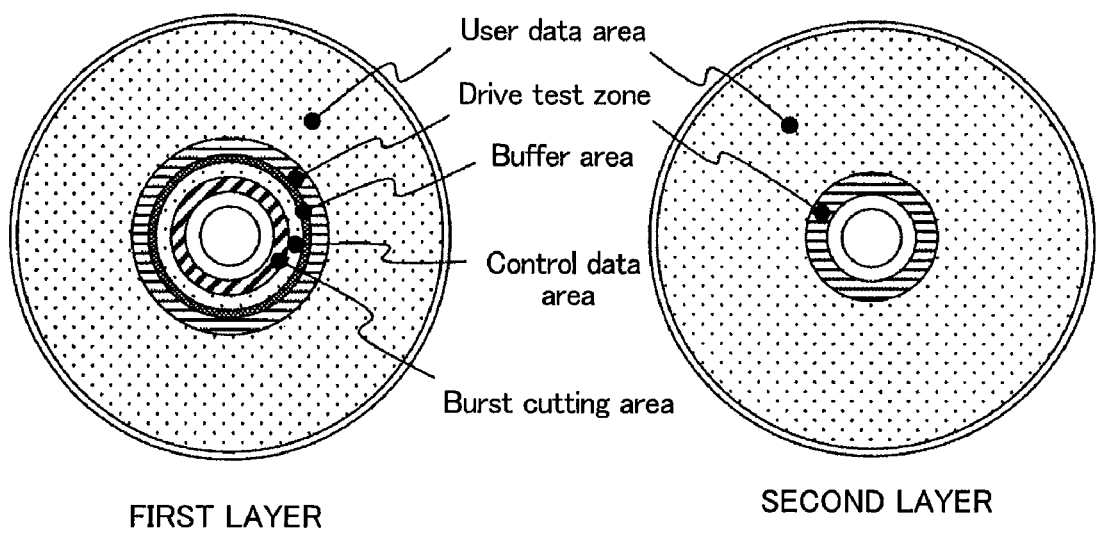
FIG. 13B presents top views illustrating the first and second layers shown in FIG. 13A.

FIG. 13A is a schematic diagram illustrating the configuration of recording layers of a recording medium according to the fourth embodiment. The configuration will not be redundantly described because it is the same as the configuration shown in FIG. 8A. FIG. 13B presents a top view of a first layer and a top view of a second layer. FIG. 13C shows specifications for the optical disk shown in FIG. 13B. The BCA, CDA, and BA are formed in a normal resolution region of the first layer. The UDA is formed in super resolution regions of the first and second layers. The BCA, CDA, and BA are not formed in the second layer. In these respects, the optical disk according to the present embodiment is similar to an optical disk of the first format, which has been described in connection with the third embodiment. The functions and objectives of the BCA, CDA, and BA will not be redundantly described because they are the same as with the first embodiment.

As the optical disk according to the present embodiment is an R-type medium, the super resolution regions of the first and second layers have a drive test zone (DTZ). The DTZ is a region where a test write is performed for recording purposes (the test write will be described later). There is a BA between the CDA and DTZ of the first layer. The radius of the BA is equivalent to several tracks. The boundary information in the BA is recorded with a wobbling signal having a land/groove structure.

Figure 14:
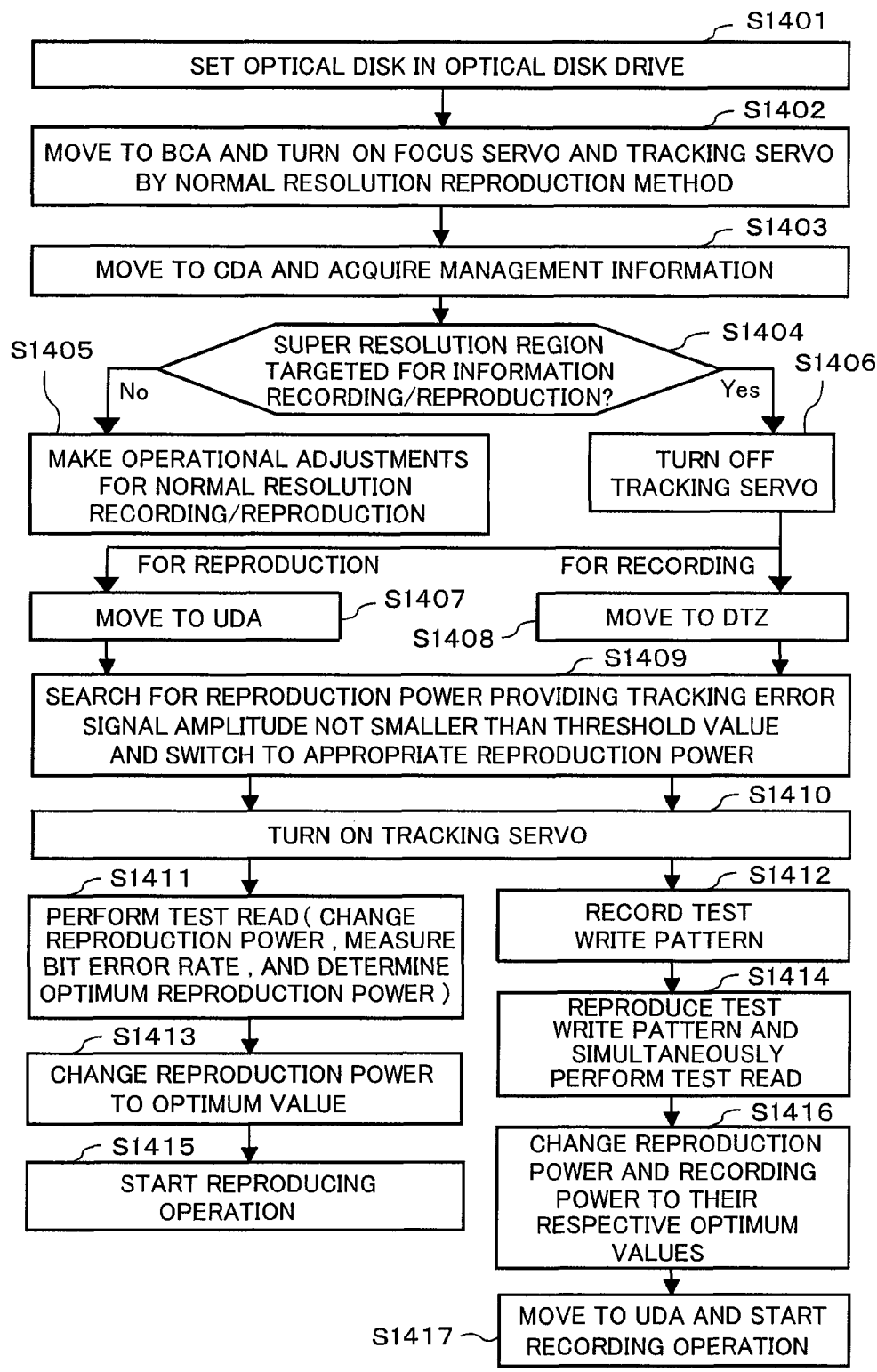
FIG. 14 is an exemplary flowchart illustrating how reproduction power control is exercised by an optical disk drive according to the fourth embodiment.

FIG. 14 is a flowchart illustrating a recording operation that a predefined optical disk drive performs in relation to the optical disk according to the present embodiment. The following description assumes that the optical disk drive used for recording is the same as shown in FIG. 3.

First of all, step 1401 is performed to set the optical disk according to the present embodiment in the optical disk drive. Steps 1401 to 1403 will not be redundantly described because they are the same as indicated in the flowchart of FIG. 4.

Step 1404 is performed to judge whether the user data region targeted for a recording or reproducing operation is a super resolution region or a normal resolution region. For super resolution region, the next step is 1406; for normal resolution region, the next step is 1405. The management information acquired in step 1403 indicated that user data was recorded in a super resolution region. Further, the UDA address information included in the management information indicated that the user data in the first layer was recorded in a region spanning between a radius of approximately 25 mm and a radius of approximately 56 mm, and that the user data in the second layer was recorded in a region spanning between a radius of approximately 21 mm and a radius of approximately 56 mm. Therefore, steps associated with a case where the query in step 1404 is answered "YES" were subsequently performed.

Steps to be performed subsequently to step 1404 vary depending on whether a reproducing operation or a recording operation is to be conducted. As the steps to be performed for a reproducing operation are the same as indicated in FIG. 4, the steps to be performed for a recording operation will be described below. When a recording operation is to be conducted, the user data to be recorded and the address information about a recording destination are stored in the memory unit 307 of the microcomputer 306 in step 1404. It means that the microcomputer 306 knows the recording destination address of the user data to be recorded. Consequently, step 1406 is performed to turn OFF the tracking servo. Next, step 1408 is performed to move the light spot to the DTZ of a recording layer to which the recording destination address belongs. The present embodiment assumes that the light spot moves to the first layer. This light spot movement is controlled by the control section. Subsequently, step 1409 is performed to conduct a reproduction power search. As an initial reproduction power value for the beginning of a test read, the value read in step 1403 is referenced. Step 1409 will not be described in detail because it is similar to step 408, which is shown in FIG. 4. After the tracking servo is turned ON in step 1410, a test write is performed in step 1412 by using the value read in step 1403 as the initial value. As the present embodiment assumes that the recommended recording power acquired for the first layer is 7 mW, the test write in step 1412 is performed by using such a recommended recording power as the initial value. The test write is performed by setting a plurality of recording power levels (Pw=6.0, 6.5, 7.0, 7.5, and 8.0 mW) on either side of the recommended recording power and recording a predetermined test write pattern in the DTZ at these recording power levels. Upon completion of test write pattern recording, each recorded test write pattern is reproduced to measure the bit error rate of a reproduction signal derived from each test write. In this instance, a test read is also performed (step 1414) by conducting reproducing operations with the reproduction power varied in predetermined increments and measuring the bit error rate of each resulting reproduction signal.

Figure 15:
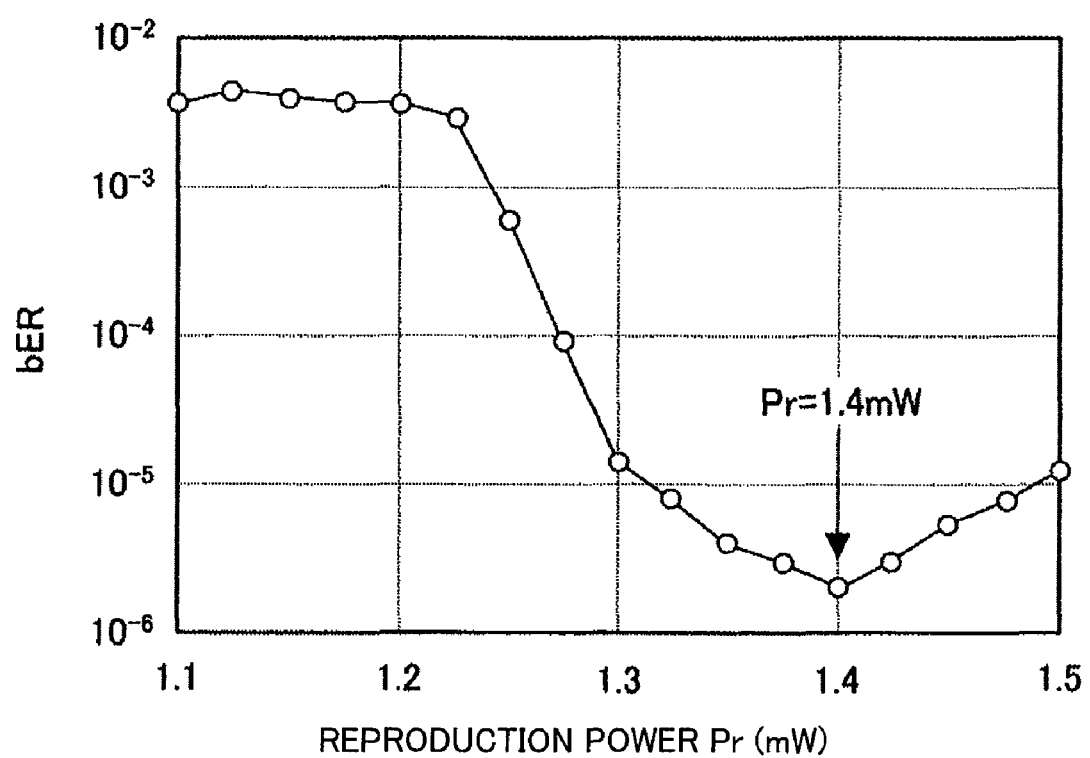
FIG. 15 is a diagram illustrating an exemplary relationship between bit error rate and reproduction power that occurs when a test read is performed.
Figure 16:
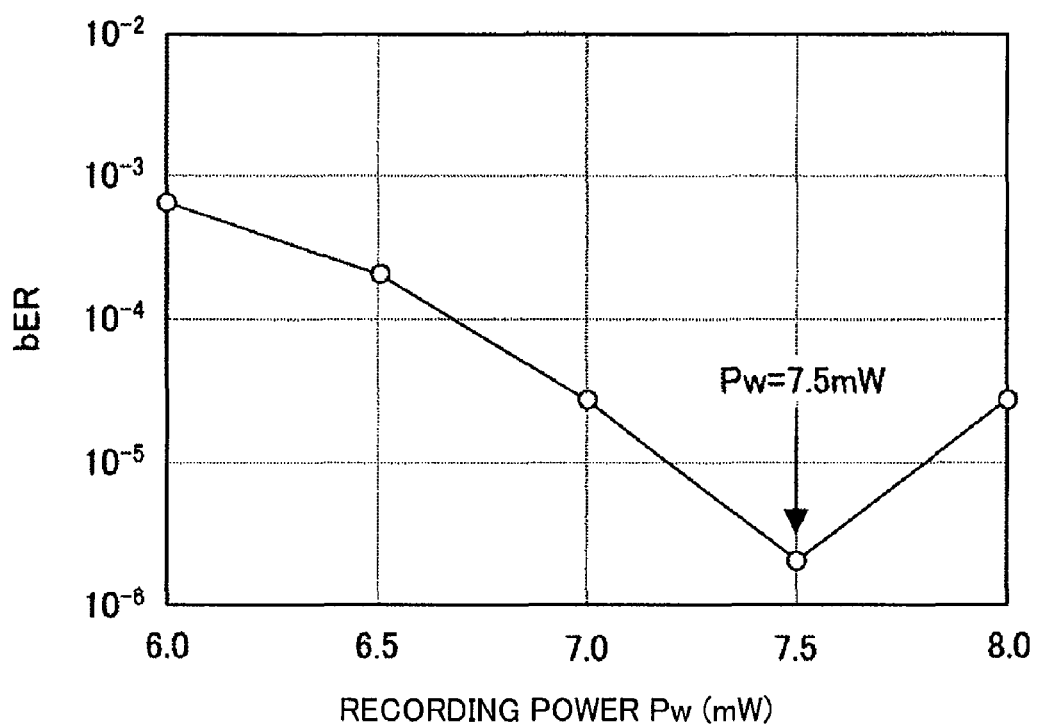
FIG. 16 is a diagram illustrating an exemplary relationship between bit error rates and recording power that occurs when a test write pattern is reproduced.

As a result of the control process described above, it was determined that the optimum recording power Pw and optimum reproduction power Pr for minimizing the bit error rate of a reproduction signal were 7.5 mW and 1.4 mW, respectively. FIG. 15 shows the results of measurements of reproduction signal bit error rates (bER) in relation to the reproduction power Pr. FIG. 16 shows the results of measurements of reproduction signal bit error rates (bER) in relation to the recording power Pw. The determined optimum recording power Pw and optimum reproduction power Pr were transferred to the optical pickup section 303 through the DSP 305 so that the LD's recording power and reproduction power were set at the optimum values (step 1416). Subsequently, the light spot was moved to the UDA to start a recording operation (step 1417).

A case where the destination of light spot movement in step 1408 was the second layer will be described below. After acquisition of management information (step 1403), the tracking servo was turned OFF (step 1406). The optical disk drive then moved to the DTZ of the second layer (step 1408). When the reproduction power was changed to the acquired recommended reproduction power (2.4 mW) for the second layer, the tracking error signal amplitude was not smaller than the threshold value (step 1409). Therefore, the tracking servo was turned ON (step 1410) at the recommended reproduction power level. In step 1412, the test write pattern was recorded at the acquired recommended recording power (11 mW) for the second layer. As the recording power for test write pattern recording, a plurality of recording power levels (Pw=10, 10.5, 11, 11.5, and 12 mW) were on either side of the recommended recording power. Subsequently, the test write pattern was reproduced to measure the dependence of the reproduction signal bit error rate on reproduction power and recording power and determine the optimum recording power Pw and optimum reproduction power Pr. As a result, the optimum reproduction power Pr and optimum recording power Pw for the second layer were 2.4 mW and 11 mW, respectively.

Setup to be performed before the start of recording was completed as described above. The optimum recording power was then used to perform a recording operation in relation to all the UDAs of the first and second layers. The results obtained by reproducing recorded signals indicated that the overall reproduction signal bit error rate of the first layer was not higher than $4 \times 10^{-6}$, and that the reproduction signal bit error rate of the second layer was not higher than $2 \times 10^{-6}$. It means that excellent reproduction signal quality was obtained.

The flowchart shown in FIG. 14 indicates that the reproducing operations for the test write and test read are performed in the same step (step 1414). Alternatively, however, the test read and test write may be performed in different steps. When such an alternative is used, the optimum recording power and reproduction power are determined by performing a test write, performing a test read of the test-written signal, and repeating this test write/test read cycle.

Fifth Embodiment

Figure 17A:
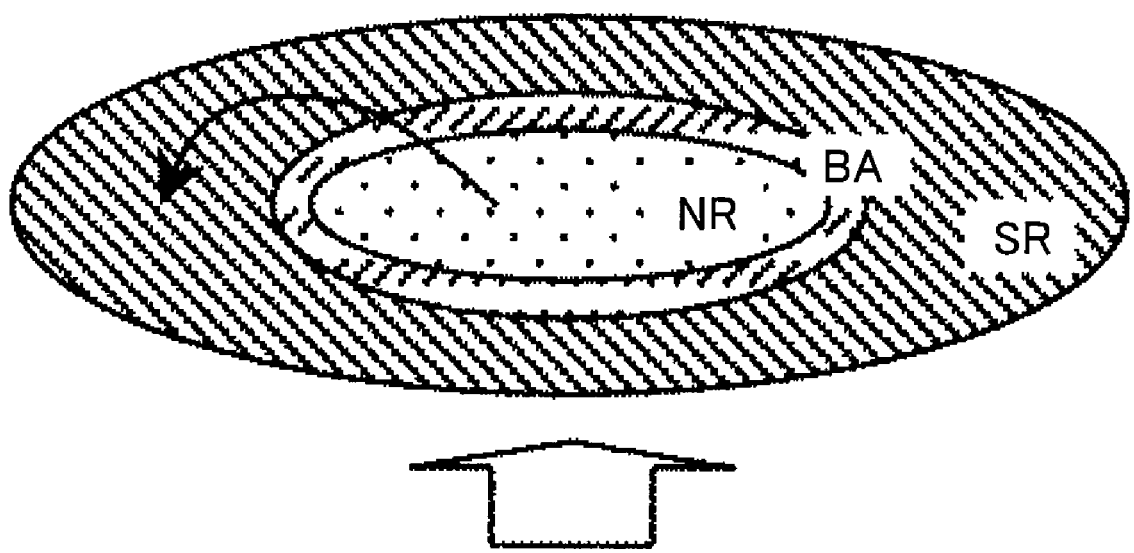
FIG. 17A is a top view illustrating a recording layer of an optical disk according to a fifth embodiment.

A fifth embodiment of the present invention will now be described in connection with a recording/reproducing operation of an optical disk that is manufactured through a polishing process. FIG. 17A is a schematic diagram illustrating the configuration of a recording layer of the optical disk according to the fifth embodiment. The optical disk shown in FIG. 17A is of a single-layer ROM type, and records user information in a super resolution region (SR) and management information in a normal resolution region (NR). FIG. 17B shows specifications for the optical disk shown in FIG. 17A. From the outside to the inside, areas formed on the optical disk are a UDA, a BA, a CDA, and a BCA. The surface of the optical disk according to the present embodiment is flattened by the polishing process described in Japanese Journal of Applied Physics 46, 3917. It should be noted, however, that only the super resolution region is polished whereas the normal resolution region is left unpolished. In other words, only the UDA is polished; therefore, a region containing a polished portion and an unpolished portion exists between the CDA and UDA. Consequently, the optical disk according to the present embodiment has a boundary region, which is located between the polished region and unpolished region. In the present embodiment, this boundary region is handled as the buffer area (BA) where no information is recorded. The management information to be recorded in the CDA includes the information about the type of each information region and the information about recommended reproduction power for the super resolution region.

As mentioned above, only the super resolution region (the UDA in the present embodiment) of the optical disk according to the present embodiment is polished. The reason is that pits and spaces of a polished portion have the same optical characteristics so that a reproduction method based on a conventional optical disk technology cannot reproduce the pits even when they are not smaller in size than optical resolution. The reason will be described in detail below with reference to FIG. 18.

FIG. 18 shows a comparison between the optical characteristics of an optical disk prepared by polishing a BD-compliant region and an optical disk prepared by leaving the BD-compliant region unpolished (the super resolution region is polished). When an attempt is made to reproduce the BD-compliant region of the polished optical disk at the same reproduction power level as for a BD method, reflected light intensity remains unchanged, that is, the reproduction signal amplitude is zero, because pit reflectivity is equal to space reflectivity and pit/space phase difference is zero, as indicated by the normal resolution region optical characteristics in the "Polished" column of FIG. 18. Consequently, reproduction is unachievable. The phase difference indicated in the table shown in FIG. 18 is a value obtained by multiplying the optical path length difference between marks and spaces (the optical path length is a distance between a mark/space and a light detector of the optical pickup section) by $2\pi/\lambda$ (light source wavelength), and represented by a value between 0 and $2\pi$. Therefore, the BD-compliant region of the polished optical disk cannot be read by the BD method. Even if the management information is recorded in the BD-compliant region, it cannot be acquired. If, on the other hand, the BD-compliant region is left unpolished, the reproduction signal amplitude is not zero because there is a pit/space phase difference although pit reflectivity is equal to space reflectivity as indicated in the "Not polished" column of FIG. 18.

Further, the following advantage is obtained by polishing the super resolution region. Referring to FIG. 18, the "Polished" column for the super resolution region indicates that the pits and spaces exhibit exactly the same optical characteristics in a low-temperature region within the light spot, and exhibit different optical characteristics in a high-temperature region. If the pits and spaces exhibit different optical characteristics in the low-temperature region, the reflected light intensity derived from the low-temperature region varies depending on the pit pattern. Thus, unnecessary noise is superimposed on the reproduction signal so that the reproduction signal quality deteriorates. When the super resolution region of an optical disk is polished in the same manner as for the optical disk according to the present embodiment, a noise component derived from the low-temperature region will not be superimposed on a reproduction signal during super resolution reproduction. As a result, reproduction signal processing is simplified.

Information can be recorded onto and reproduced from the optical disk according to the present embodiment by performing steps indicated in FIG. 4 or 14. However, these steps will not be redundantly described because they have already been described. In the present embodiment, however, when the optical disk drive moved to the UDA (step 407 or 1407) after the tracking servo was turned OFF in step 406 or 1406 as indicated in FIG. 4 or 14, focusing was properly achieved because the focus error signal was not disordered even if the optical disk drive passed through the BA with the focus servo activated. In the present embodiment, the recommended reproduction power recorded in the management region was 1.6 mW, whereas the optimum reproduction power minimizing the bit error rate of a reproduction signal was 1.8 mW. When reproduction control was exercised by using the acquired optimum reproduction power, satisfactory reproduction signal quality (bER<$1\times10^{-6}$) was achieved within the entire UDA.

As described above, when the super resolution region is polished with the normal resolution region left unpolished, it is possible to manufacture an optical disk that reproduces information in the normal resolution region even when a conventional normal resolution reproduction method is used, causes the pits (or marks) and spaces in the low-temperature region within the light spot for the super resolution reproduction to exhibit the same optical characteristics, and causes the pits (or marks) and spaces in the high-temperature region within the light spot for the super resolution reproduction to exhibit different optical characteristics. Consequently, the fifth embodiment makes it possible to implement an optical disk that achieves higher reproduction signal quality than optical disks described in connection with the first to fourth embodiments.

Sixth Embodiment

A sixth embodiment of the present invention will now be described in connection with an exemplary configuration of an optical disk drive that is capable of controlling the reproduction power in accordance with eccentricity information about an optical disk. For the sake of simplicity, the following description assumes that the optical disk according to the first embodiment is used. The relationship between super resolution reproduction and optical disk eccentricity will be described below. If a significantly eccentric optical disk is used for super resolution region reproduction, the reproduction signal quality varies during one rotation of the optical disk. The reason is that the lens shift amount of an optical pickup varies due to eccentricity, varying the effective radiation power prevailing on the surface of a super resolution film, thus varying the size of the high-temperature region within the light spot for super resolution reproduction. The "lens shift amount" is the amount of deviation between the eccentric center of the optical disk and the center of the tracks. If the center of the light spot deviates from the center of the tracks, the lens shift amount can be calculated from the amount of objective lens movement that is required for moving the center of the light spot to the center of the tracks. The reproduction signal quality variation described above is compensated for by exercising reproduction power control to vary the reproduction power in accordance with the eccentricity information about the optical disk when the super resolution region is to be adjusted for reproduction. More specifically, when the intensity of light emitted from a light source included in the optical system for the optical pickup section is adjusted in consideration of various items of eccentricity information, such as the "lens shift amount", it is possible to avoid a change in the size of the high-temperature region within the light spot during one rotation of the optical disk, thereby avoiding variations in reproduction signal quality.

Figure 19:
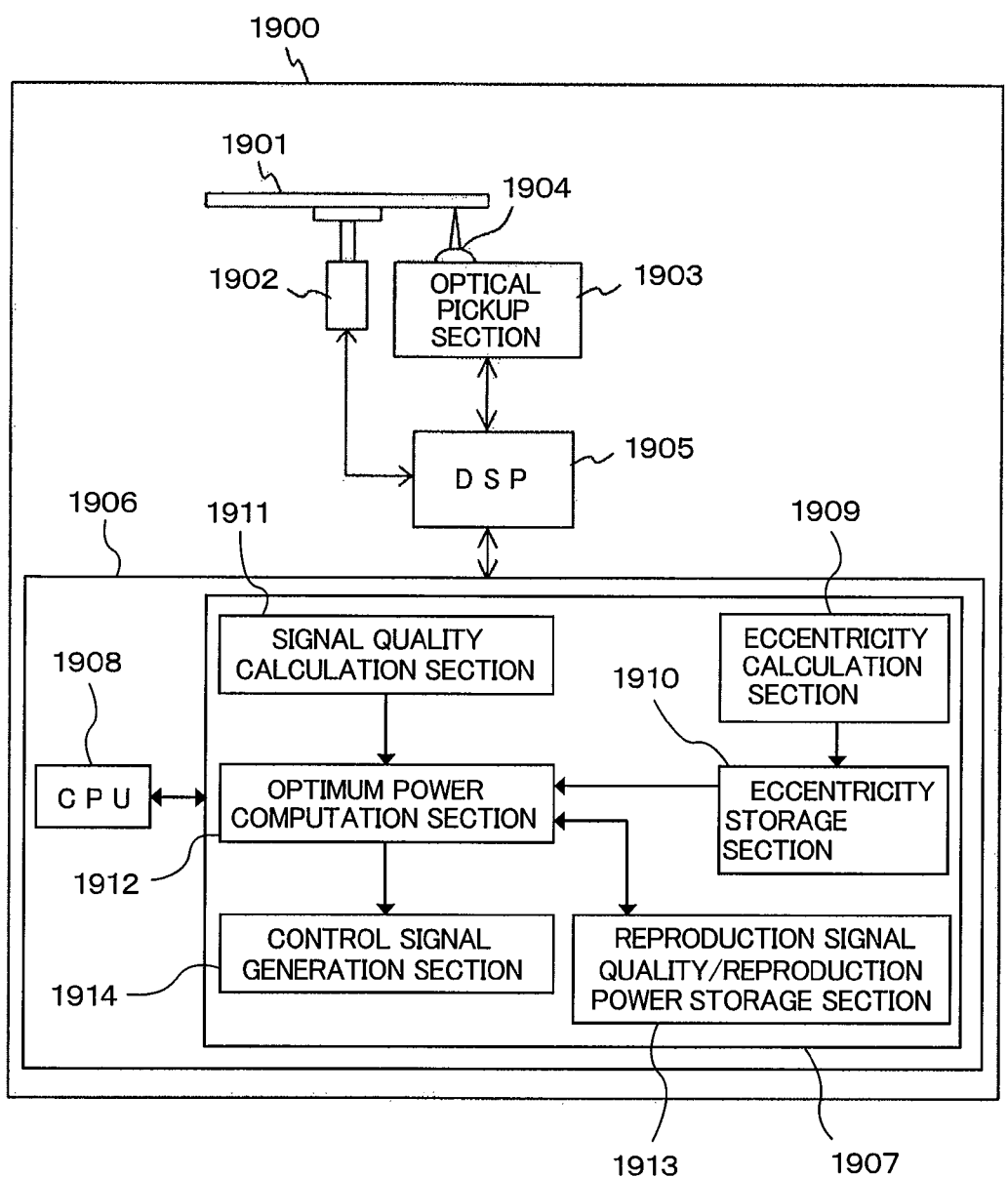
FIG. 19 is a schematic diagram illustrating the overall configuration of an optical disk drive according to a sixth embodiment.

FIG. 19 illustrates an exemplary internal configuration of an optical disk drive having a reproduction power control function. The optical disk drive 1900 shown in FIG. 19 includes a spindle motor 1902 for retaining and rotationally driving an optical disk 1901, an optical pickup section 1903 for reading information from and writing information onto the optical disk 1901, and a control section for providing overall integrated control of the optical disk drive. The control section shown in FIG. 19 includes a digital signal processor (DSP) 1905 and a microcomputer 1906. The optical pickup section 1903 includes a laser diode (LD) (not shown), which serves as a light source for irradiating the optical disk 1901 with laser light; and an optical system (not shown), which irradiates the optical disk with light generated from the light source or detects light reflected from the optical disk. The optical pickup section 1903 also includes spherical aberration correction, focus servo, and tracking servo actuators (not shown). These actuators are driven in accordance with control signals from the DSP 1905.

The DSP 1905 functions as an LD driver (LDD), a recording data encoder, and a reproduction signal decoder, exercises servo control over the optical pickup section 1903 and rotation control over the spindle motor 1902, and stores information. The microcomputer 1906 includes a central processing unit (CPU) 1908 for evaluating and processing signals received from the DSP 1905, such as a reproduction signal and servo signal, and a storage section (memory unit) 1907. The microcomputer 1906 feeds various signals back to the DSP 1905. The signals fed back to the DSP 1905 include, for instance, optimum values of reproduction power and recording power and signals concerning the servo actuators. Software stored in the memory unit will be described in detail later. Although FIG. 19 indicates that the control section is separated into the DSP 1905 and microcomputer 1906, the DSP 1905 and microcomputer 1906 may alternatively be integrated into a single LSI chip.

When the CPU 1908 executes software programs stored in the memory unit 1907, functional blocks shown in FIG. 19 are implemented in the microcomputer 1906. For the sake of convenience, FIG. 19 indicates that the functional blocks are formed in the memory unit 1907. In reality, however, the functional blocks are implemented when the CPU and memory unit operate in a coordinated manner. In the present embodiment, various functional blocks are formed in the microcomputer 1906. The functional blocks include an eccentricity calculation section 1909 for calculating the amount of eccentricity, an eccentricity storage section 1910 for storing the calculated mount of eccentricity, a signal quality calculation section 1911 for calculating the bit error rate (bER) and other information about signal quality from the information about a reproduction signal, an optimum power computation section 1912 for calculating reproduction power from the information about signal quality and eccentricity, a reproduction signal quality/reproduction power storage section 1913 for storing the results of calculations performed by the optimum power computation section, and a control signal generation section 1914 for converting a calculation result produced by the optimum power computation section to a control signal for the DSP.

Figure 20:
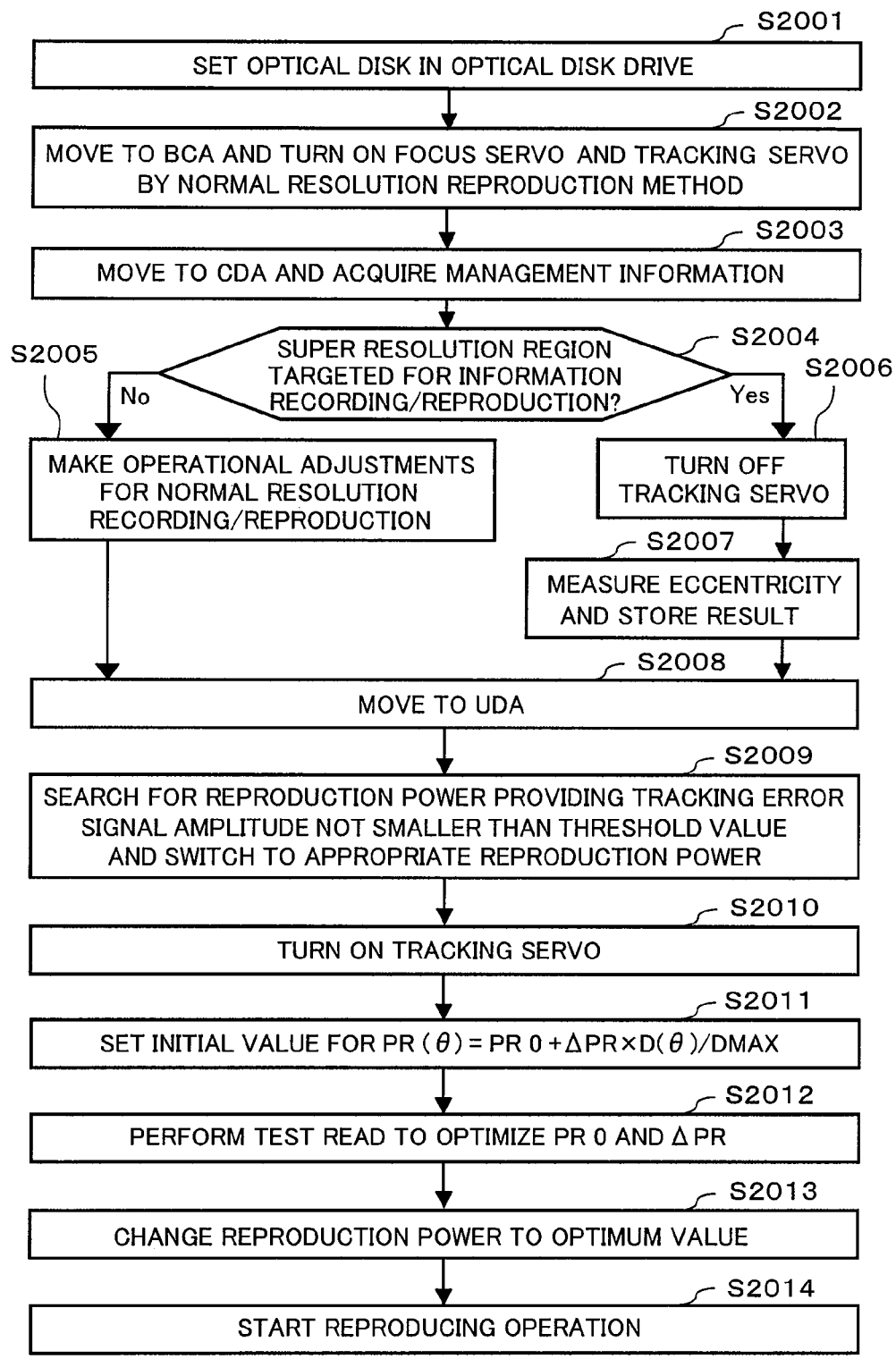
FIG. 20 is an exemplary flowchart illustrating how reproduction power control is exercised by the optical disk drive according to the sixth embodiment.

Power control provided by the optical disk drive shown in FIG. 19 will now be described in detail with reference to FIG. 20. FIG. 20 is a flowchart illustrating how power control is exercised during reproduction. First of all, the optical disk is set in the optical disk drive (step 2001). The laser irradiation position is then moved to the BCA to conduct laser irradiation at a reproduction power of 0.3 mW. After the focus servo is turned ON, the tracking servo is turned ON by a push-pull method (step 2002). The management information including the information about the type of each information region on the optical disk 1901 and the information about recommended reproduction power for the super resolution region is then acquired by moving the reproduction position to the CDA and reproducing signals recorded in the CDA (step 2003). When the acquired management information indicates that the UDA is formed in the super resolution region and that the information region to be reproduced is the super resolution region (step 2004), the tracking servo is turned OFF (step 2006). For normal resolution region after step 2004, the next step is 2005.

Figure 21:
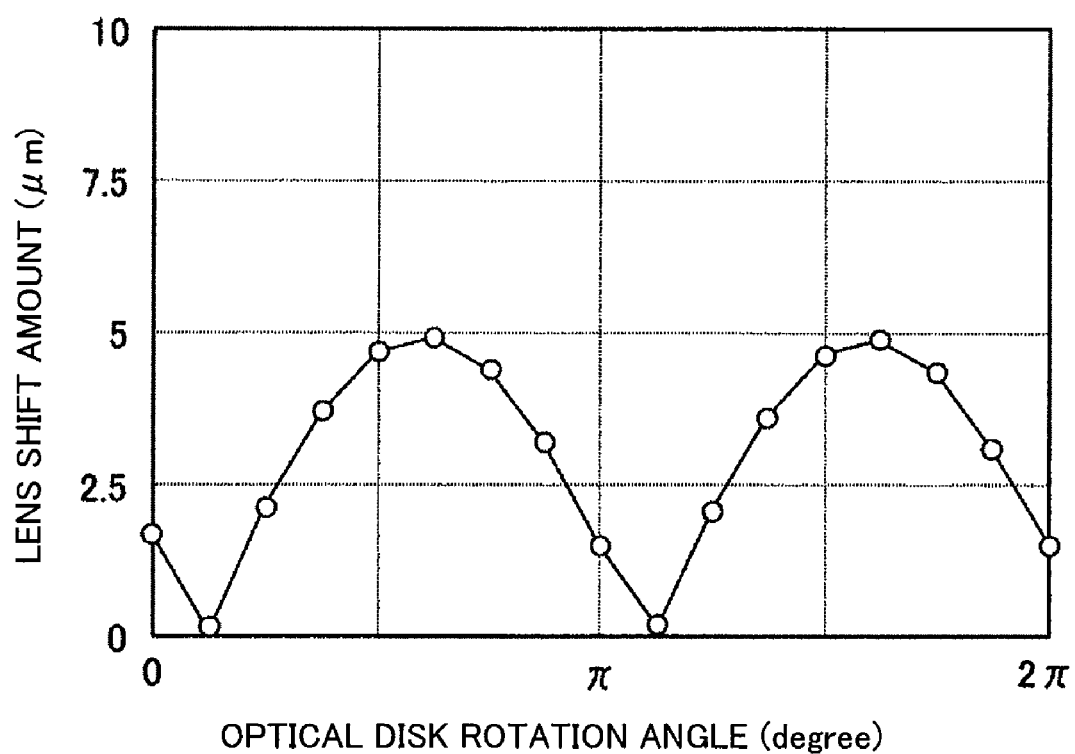
FIG. 21 is a diagram illustrating the relationship between a lens shift amount and an optical disk rotation angle.

In step 2007, the amount of optical disk eccentricity is measured. The eccentricity calculation section 1909 calculates the rotation angle information about the optical disk in accordance with a spindle index signal supplied from the DSP, and calculates the eccentricity information about rotation angles derived from the reproduction signal and tracking error signal. In the present embodiment, the lens shift amount, which is calculated from the tracking error signal, is used as the eccentricity information. The eccentricity information is calculated by comparing the tracking error signal against an RF signal, judging whether a track is crossed in an outward direction or an inward direction, using the tracking error signal to calculate the number of tracks by which outward or inward deviation has occurred in relation to the center of eccentricity at each rotation angle, and multiplying the number of tracks at each rotation angle by the track pitch of the optical disk. The calculated eccentricity information and the information about the associated rotation angle are both transferred to the eccentricity storage section 1910 for storage purposes. If a signal indicative of a rotation angle is recorded on the optical disk 1901, the rotation angle of the optical disk 1901 can also be acquired from a reproduction signal derived from rotation angle information. Further, the lens shift amount can also be calculated from a drive voltage signal for a lens actuator. Furthermore, if the optical pickup section includes means for directly measuring the lens shift amount, the lens shift amount can be directly acquired. FIG. 21 shows the relationship between a calculated optical disk rotation angle and lens shift amount. The vertical axis of FIG. 21 indicates a lens shift amount, whereas the horizontal axis indicates an optical disk rotation angle from a predetermined rotation start position. FIG. 21 indicates that the lens shift amount greatly varies during one rotation of the optical disk.

Next, the light spot is moved to the UDA (step 2008). The reproduction power is then changed to the recommended reproduction power (1.3 mW) acquired from the CDA. If the tracking error signal amplitude is smaller than a threshold value at the recommended reproduction power, a reproduction power search is conducted until the threshold value is reached (step 2009). Control exercised for such a reproduction power search will not be redundantly detailed because it is exercised in the same manner as in the first embodiment. When a reproduction power for providing a tracking error signal amplitude not smaller than the threshold value is obtained, the tracking servo is turned ON (step 2010). However, if the amount of eccentricity is large, the reproduction signal amplitude varies during one rotation of the optical disk, as implied in FIG. 21. The reason is, as mentioned earlier, that a change in the lens shift amount changes the intensity of laser light incident on the super resolution film, thereby changing the size of the high-temperature region. Thus, reproduction power control is initiated to control the reproduction power in accordance with the lens shift amount information shown in FIG. 21 so that the size of the high-temperature region remains substantially constant irrespective of the optical disk rotation angle.

First of all, step 2011 is performed to calculate an initial value for angular control of reproduction power. The present embodiment assumes that the angular dependence of reproduction power is expressed by the following equation where θ is an optical disk rotation angle, Pr(θ) is a reproduction power prevailing at the rotation angle θ from the origin of rotation, d(θ) is a lens shift amount at θ, ΔPr is a reproduction power correction coefficient, and dmax is the maximum lens shift amount.

$$Pr(\theta) = Pr0 + \Delta Pr \times d(\theta)/d\max \quad \text{(Equation 1)}$$

Pr0 is a base reproduction power, which corresponds to a fixed component of reproduction power and does not vary with the angle. ΔPr×d(θ)/dmax corresponds to a fluctuation component of reproduction power and varies with the angle. The lens shift amount normalized by the maximum value dmax is multiplied by the reproduction power correction coefficient ΔPr so that Pr(θ) varies with the lens shift amount.

The value determined in step 2009 is used as the initial value for Pr0. In the present embodiment, Pr0=1.3 mW. The present embodiment uses a value of 0.4 mW as the initial value for ΔPr so that the reproduction signal amplitude remains constant during one rotation of the optical disk. The initial value for ΔPr may be prerecorded in the CDA or calculated by the optimum power computation section 1912. The optimum power computation section 1912 calculates Pr(θ) from Equation 1 in accordance with the information about the lens shift amount and rotation angle, which is stored in the eccentricity storage section 1910, and stores the result of calculation and the information about the rotation angle θ in the reproduction signal quality/reproduction power storage section 1913.

Figure 22:
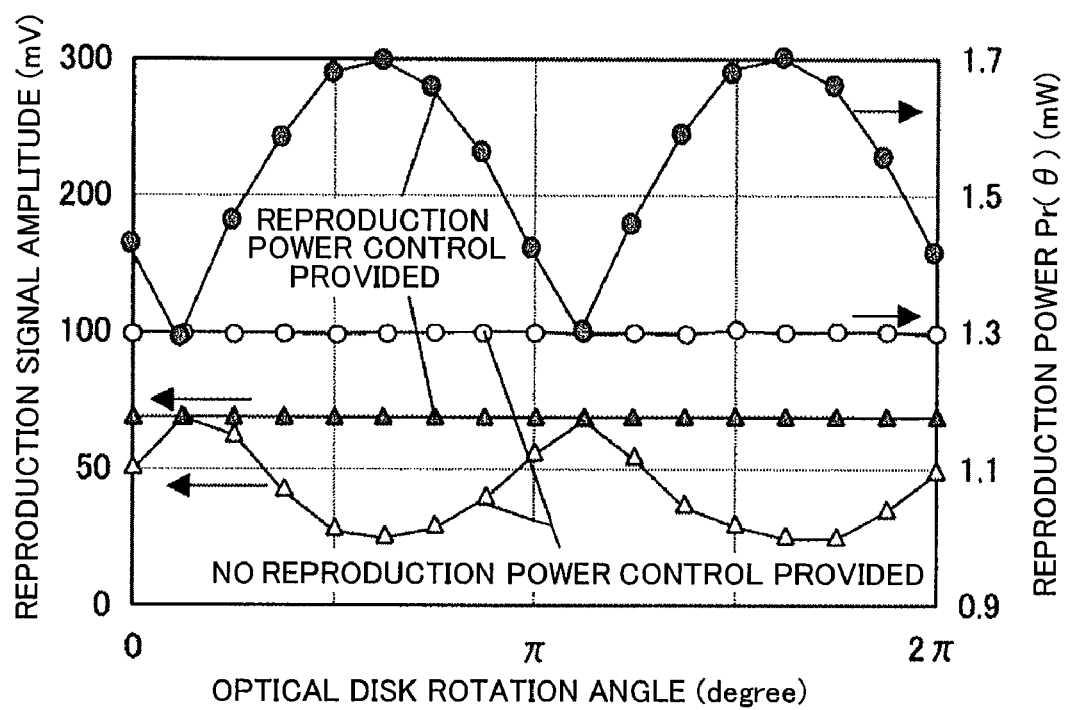
FIG. 22 is a diagram that illustrates the optical disk rotation angle dependence of reproduction signal amplitude and reproduction power to compare a case where reproduction power control is exercised in consideration of the amount of eccentricity against a case where no such control is exercised.

FIG. 22 illustrates the reproduction signal amplitude and reproduction power prevailing on a predetermined track in the UDAs to compare a case where reproduction power control is exercised in step 2011 against a case where no such control is exercised. Black dots represent a case where reproduction power control is exercised, whereas white dots represent a case where reproduction power control is not exercised. FIG. 22 reveals that exercising reproduction power control maintains a constant reproduction signal amplitude during one rotation of the light spot, thereby preventing a lens shift from changing the size of the high-temperature region within the light spot.

Figure 23:
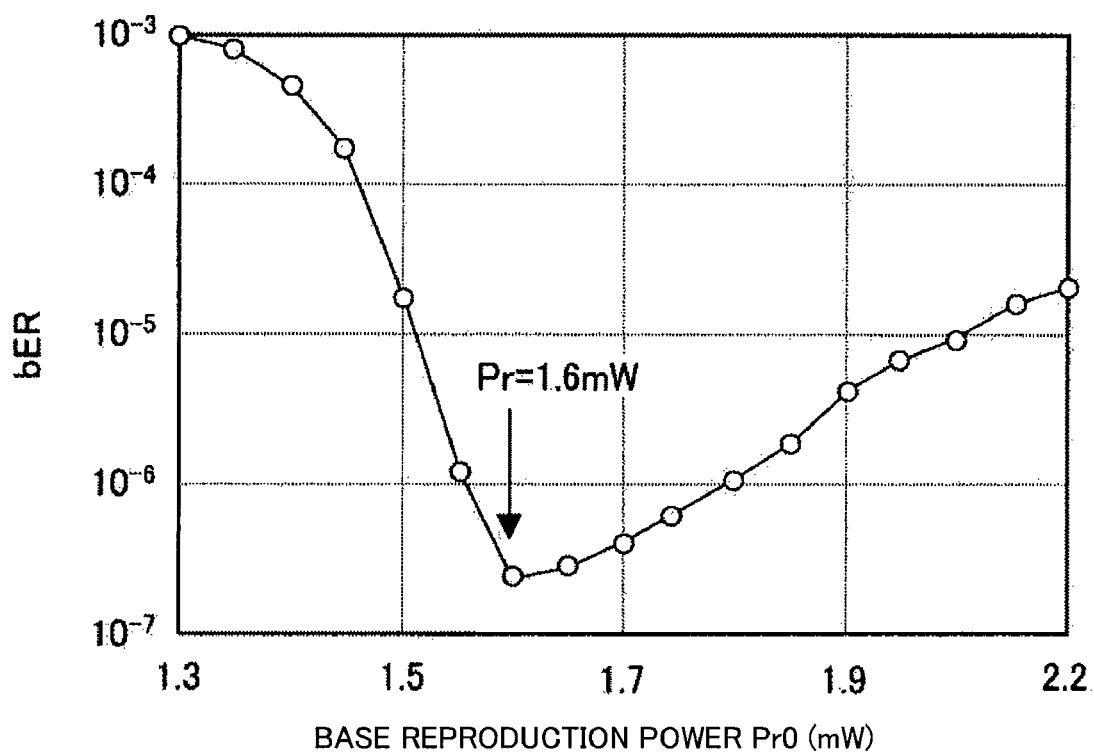
FIG. 23 is a diagram illustrating the relationship between a bit error rate and base reproduction power Pr0.

Next, a test read is performed to optimize Pr(θ) (step 2012). Pr0 and ΔPr are reproduction power control parameters and need to be adjusted to minimize the reproduction signal bit error rate (bER). This time, the adjustment process was simplified by varying Pr0 and ΔPr with the ratio between Pr0 and ΔPr (ΔPr/Pr0) fixed at its initial value ratio (0.4/1.3=0.3), performing calculations from their respective reproduction signal bit error rates and the reproduction signal supplied from the DSP 305, and comparing the calculated bit error rates to determine Pr0 and ΔPr that achieved bit error rate minimization. FIG. 23 shows the relationship between the bit error rate calculated in step 2012 and the base reproduction power Pr0. FIG. 23 indicates that the reproduction signal bit error rate is minimized when Pr0=1.6 mW. Thus, it was determined that the optimum base reproduction power Pr0 was 1.6 mW. Further, as ΔPr/Pr0=0.3, it was determined that the optimum reproduction power correction coefficient ΔPr was 0.48 mW. Subsequently, the optimum power computation section 1912 calculated Pr(θ) as appropriate for each optical disk rotation angle θ, and stored the results of calculations in the reproduction signal quality/reproduction power storage section 1913.

Technically, it would be possible to determine better optimum values for Pr0 and ΔPr when Pr0 and ΔPr are independently varied to make adjustments. In reality, however, no practical problem arises even if the adjustments are made with the ratio between Pr0 and ΔPr maintained constant as indicated in step 2012 of the present embodiment. The reason is described below.

In Equation 1, d(θ)/dmax takes a value of 0 to 1. Therefore, Pr(θ) has a maximum value of Pr0+ΔPr and a minimum value of Pr0. Consequently, when the maximum value of Pr(θ) is divided by the minimum value, the resulting value is $Pr_{max}/Pr_{min}=1+\Delta Pr/Pr0$. It physically means that when the lens shift amount d(θ) is at its maximum, a super resolution spot (high-temperature region) having the same size as when the lens shift amount is zero can be obtained by performing laser irradiation at a reproduction power that is (1+ΔPr/Pr0) times higher than when the lens shift amount is zero. In other words, maintaining the ΔPr/Pr0 ratio constant means determining the amplitude of the fluctuation component of reproduction power in accordance with the fixed component. When the amplitude of the fluctuation component is determined, the eccentricity-induced variation in the super resolution spot size is controlled by the fluctuation component (ΔPr×d(θ)/dmax) in Equation 1. Therefore, the size of the super resolution spot is maintained constant for one whole track. As a result, the signal amplitude is also maintained constant. Subsequently, Pr0 should be optimized so as to minimize the bit error rate (bER). As described above, it is possible to avoid bit error rate deterioration, which may result from signal amplitude variation, even when the reproduction power is determined with the ΔPr/Pr0 ratio maintained constant. It should be noted that when the reproduction power is to be determined by the method according to the present embodiment, the data about at least one whole track is necessary because the optimum reproduction power Pr(θ) for each rotation angle θ is required.

The control signal generation section 1914 converted the calculated Pr(θ) value to a DSP's control signal and supplied the control signal to the DSP 1905. Then, the DSP 1905 controlled the LD's drive voltage and changed the reproduction power to the optimum value (step 2013). Subsequently, a reproduction operation was started to exercise appropriate reproduction power control in accordance with the optical disk rotation angle (step 2014). As a result, satisfactory reproduction signal quality (bER<9×10$^{-7}$) was achieved within the entire DA.

In the present embodiment, reproduction power control is started after completion of step 2010 in FIG. 20 (after the tracking servo is turned ON). However, reproduction power control may alternatively be started before the tracking servo is turned ON, that is, immediately after completion of step 2009, with a view toward tracking servo stabilization. In such an instance, the same result as described above can be obtained by setting the base reproduction power Pr0 and reproduction power correction coefficient ΔPr in such a manner as to provide stabilized tracking, turning ON the tracking servo, and making detailed reproduction power control adjustments in the same manner as in the embodiment described above.

Further, although the flowchart in FIG. 20 indicates that the amount of eccentricity is measured in step 2007, the same result was obtained when the amount of eccentricity was measured in step 2009. An alternative would be to measure the amount of eccentricity when reproduction power control is started in steps 2011 and 2012, and perform a subsequent reproduction power control process by using the obtained information about the amount of eccentricity. When such an alternative is used, the amount of eccentricity should be measured through the use of a drive voltage for the lens actuator. As compared to the amount of optical disk eccentricity, the lens actuator drive voltage, which shifts the lens, is directly related to the lens shift amount. It is therefore expected that the lens shift amount will be calculated more precisely when the lens actuator drive voltage is used for measurement purposes. When the entire optical disk surface was measured after making initial adjustments for reproduction control including reproduction power control by the above method, satisfactory reproduction signal quality (bER<5×10$^{-7}$) was achieved within the entire UDA. Even if a conflict occurs between a spindle index and optical disk rotation angle during optical disk rotation in a situation where the amount of eccentricity is measured during reproduction power control, reproduction signal quality can be maintained because the information about the optical disk rotation angle and lens shift amount is updated as needed.

The foregoing description assumes that reproduction power control is exercised in accordance with Equation 1. However, reproduction power control need not always be exercised in accordance with Equation 1. For example, Equation 2, 3, or 4 below may be used depending on the relationship between the lens shift amount and the size of the high-temperature region within the light spot.

$$Pr(\theta)=Pr0+\Delta Pr \times \{d(\theta)/d\max\}^k \quad (k=\tfrac{1}{3}, \tfrac{1}{2}, 1, 2, \text{etc.}) \quad \text{(Equation 2)}$$

$$Pr(\theta)=Pr0+\Delta Pr \times |\sin(\theta+\alpha)| \quad \text{(Equation 3)}$$

$$Pr(\theta)=Pr0+\Delta Pr \times \sin(\theta+\alpha) \quad \text{(Equation 4)}$$

$$Pr(\theta)=Pr0+\Delta Pr \times \sin(\theta+\alpha)^k \quad (k=\tfrac{1}{3}, \tfrac{1}{2}, 1, 2, \text{etc.}) \quad \text{(Equation 5)}$$

Equation 1 assumes that the lens shift amount and reproduction power (physically the size of the high-temperature region) are linearly proportional. Equation 2 assumes that the fluctuation component of reproduction power is expressed by the power of a normalized lens shift amount (Equation 2 is equivalent to Equation 1 when k=1). An exponential function may better match the rotation angle dependence of reproduction power than a linear function depending on the characteristics of an employed medium. Therefore, the expression formula for Pr(θ) should be changed as needed.

Further, when the optical disk according to the present embodiment is used, the variation in the lens shift amount during one rotation of the light spot is similar in appearance to the absolute value of a sine wave as indicated in FIG. 21. Therefore, reproduction power control may be expressed by the absolute value of a sine function as indicated in Equation 3. Another alternative is to use a sine function as is as indicated in Equation 4. Still another alternative is to use an exponential function of a sine function as indicated in Equation 5. The symbol α represents a phase correction value for synchronizing with the variation in the lens shift amount. When the reproduction power Pr(θ) was controlled in accordance with Equation 3, the bit error rate derived from the entire disk surface was not higher than 1×10⁻⁶. This means that the reproduction signal quality achieved when Equation 3 was used was substantially the same as that was achieved when Equation 1 was used. Although the trigonometric function in Equations 3 and 4 is a sine function, it is obvious that the same performance will be obtained even when a cosine function is used.

While reproduction power control is exercised as described in connection with the present embodiment, the reproduction power Pr(θ) is continuously varied within an optical disk track. However, it may be difficult for some of the existing optical disk drives to provide multi-valued control of reproduction power due to the performance characteristics of an internal storage device and LD drive device. In such an instance, reproduction power control is exercised by varying the reproduction power Pr(θ) discretely instead of continuously. As reproduction power discrete values for reproduction θ, the value n (n=1, 2, 3, . . . ) appropriate for the employed optical disk drive can be used. It should be noted, however, the reproduction signal bit error rate (bER) increases with a decrease in the value n.

Angular control of reproduction power that is exercised in accordance with the present embodiment has been described on the assumption that the employed optical disk has the same configuration as that used in the first embodiment. However, it is obvious that reproduction power control exercised in consideration of the amount of eccentricity, which has been described in connection with the present embodiment, is also applicable to the optical disks described in connection with the second to fifth embodiments. Further, power control exercised in consideration of the amount of eccentricity, which has been described in connection with the present embodiment, is applicable not only to the control of reproduction power but also to the control of recording power. When power control according to the present embodiment is to be applied to the control of recording power, a test write should be performed at a recording power determined in consideration of the optical disk rotation angle on the assumption that the angular dependence of recording power is as indicated in Equation 1, 2, 3, or 4. Further, the parameters contained in the equation should be optimized by using the reproduction signal derived from the test write. In the case, for instance, of the flowchart in FIG. 14, it is necessary to measure the amount of eccentricity after completion of step 1406 and then perform a test write in step 1414 at a recording power determined in consideration of the angular dependence of recording power. The recording power parameters in Equation 1, 2, 3, or 4 can then be optimized by calculating the bit error rate (bER) from the reproduction signal obtained in step 1414. This ensures that the recording power can be controlled with increased precision even when the amount of eccentricity is large.

The invention claimed is:

1. An optical recording/reproducing apparatus to reproduce information on an information recording medium having a recording region adapted to super resolution reproduction, the optical recording/reproducing apparatus comprising:
   a spindle motor for retaining and rotationally driving the information recording medium;
   an optical pickup for irradiating the information recording medium with a laser beam, receiving reproduction light, and outputting a reproduction signal; and
   a control section for receiving the reproduction signal from the optical pickup;
   wherein, when the information on the information recording medium is to be reproduced, the optical recording/reproducing apparatus optimizes the reproduction power of the laser beam by repeatedly irradiating the recording region adapted to super resolution reproduction with the laser beam at a predetermined power, judging whether the resulting reproduction signal output satisfies a predetermined threshold value, and adjusting the power of the laser beam in accordance with the judgment result, and wherein the control section controls the reproduction power of the laser beam for executing a tracking with a super resolution effect, and in accordance with the amount of eccentricity of the information recording medium.

2. The optical recording/reproducing apparatus according to claim 1, wherein the control section includes a storage section, which stores the relationship between the amount of eccentricity and the rotation angle of the information recording medium, references the stored relationship, and calculates the amount of eccentricity.

3. The optical recording/reproducing apparatus according to claim 1, wherein the information recording medium comprises an optical disk and wherein the control section controls the reproduction power of the first region in accordance with the rotation angle of the optical disk.

4. The optical recording/reproducing apparatus according to claim 1, wherein the tracking with the super resolution effect has a tracking pitch which is smaller than an optical resolution of the information recording medium.

5. The optical recording/reproducing apparatus according to claim 4, wherein the information recording medium comprises an optical disk and wherein the tracking pitch is for a super resolution region on the optical disk.

\* \* \* \* \*